US011551558B1

(12) United States Patent
Rezaee et al.

(10) Patent No.: US 11,551,558 B1
(45) Date of Patent: Jan. 10, 2023

(54) AIRLINE FLIGHT OPERATIONS SUPPORT

(71) Applicant: AMERICAN AIRLINES, INC., Fort Worth, TX (US)

(72) Inventors: Arman Rezaee, Euless, TX (US); Michael Finn, Euless, TX (US); Christopher S. Roush, Keller, TX (US); Rocco Bova, Keller, TX (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 266 days.

(21) Appl. No.: 16/436,362

(22) Filed: Jun. 10, 2019

Related U.S. Application Data

(60) Provisional application No. 62/685,565, filed on Jun. 15, 2018.

(51) Int. Cl.
*G08G 5/00* (2006.01)
*G06F 21/31* (2013.01)
*G06Q 10/06* (2012.01)

(52) U.S. Cl.
CPC ......... *G08G 5/0026* (2013.01); *G06F 21/31* (2013.01); *G06Q 10/0637* (2013.01); *G06Q 10/06314* (2013.01); *G08G 5/0039* (2013.01); *G08G 5/0043* (2013.01)

(58) Field of Classification Search
CPC .. G08G 5/0026; G08G 5/0039; G08G 5/0043; G06F 21/31; G06Q 10/06314; G06Q 10/0637
See application file for complete search history.

(56) References Cited

U.S. PATENT DOCUMENTS

| | | | | |
|---|---|---|---|---|
| 10,326,748 B1* | 6/2019 | Brisebois | ............... | G06F 21/31 |
| 2011/0066367 A1* | 3/2011 | Ogasawara | ........ | G01C 21/3605 |
| | | | | 701/533 |
| 2015/0120097 A1* | 4/2015 | Hathaway | ............... | H04L 67/12 |
| | | | | 701/14 |
| 2016/0189066 A1* | 6/2016 | Liao | ....................... | G06Q 50/14 |
| | | | | 705/6 |

(Continued)

OTHER PUBLICATIONS

Roberson, Bill, "Fuel Conservation Strategies: Cost Index Explained," 2007, Boeing Commercial Aeromagazine, 2nd quarter 2007, pp. 26-28 (Year: 2007).*

*Primary Examiner* — Aniss Chad
*Assistant Examiner* — Madison R Hughes
(74) *Attorney, Agent, or Firm* — Haynes and Boone, LLP

(57) ABSTRACT

A method of displaying an electronic report on a GUI that includes receiving a user identifier and an authentication identifier associated with a user gaining access to a first application; displaying, on the GUI, a first window associated with the first application; displaying, via the first window, a listing of monitored flights; receiving, via the first window, a request; accessing, using the first application, a second application and a third application that are different from each other and the first application; updating the displayed listing of monitored flights using information accessed from the second and third applications; wherein a flight has a delay greater than two hours; and receiving, via the first window, a request for the electronic report for the flight; displaying, on the GUI and via a second window, the electronic report for the flight that includes information from each of the second and third applications.

22 Claims, 16 Drawing Sheets

(56) References Cited

U.S. PATENT DOCUMENTS

| | | | |
|---|---|---|---|
| 2017/0046962 A1* | 2/2017 | Shipley | G08G 5/0013 |
| 2018/0016034 A1* | 1/2018 | Joyson | G06Q 10/06315 |
| 2018/0137766 A1* | 5/2018 | Bostick | G08G 5/0082 |

* cited by examiner

FIG. 5

Operational:

| FLT | FROM | TO | SKD | SKD-2 | OLD TAIL | NEW TAIL | DELAY | STATUS | NEW ETR | CA MOT | FO MOT | FB MOT | NOTES |
|---|---|---|---|---|---|---|---|---|---|---|---|---|---|
| 90 | ORD | LHR | 915 | 1415 | BAR | BAR | 435 | ETD | | 1801/08L | 1801/08L | 1801/08L | FWD CGO FLOOR LOCK, UNABLE TO MAKE CURFEW, RON |
| 1199 | MIA | JFK | 1415 | 1915 | 5FB | 5EV | 75 | ETD | | 2208/08L | 2208/08L | | RUB FROM 1558 LIM |
| 278 | JFK | EDI | 1905 | 2305 | 5FG | 5EV | 150 | ETD | | 0043/09L | 0043/09L | 0043/09L | POS NSET TO DFW TO BACK UP KEF OPS, UNER MOGT TURN |
| 734 | PHL | MAN | 2110 | 0110 | 287 | 286 | | SKD | 2000/08* | | | | P1 ANTENNA CHANGE |
| 232 | DFW | KEF | 2020 | 0120 | 5FF | SFF | | SKD | D1600/08 | | | | LH FWD B/P C/B TRIP |
| 991 | MIA | CNF | 2245 | 0245 | 399 | 399 | | SKD | 1900/08 | | | | Ac3 |
| 758 | PHL | ATH | 1630 | 2030 | 275 | 275 | | SKD | 1630/08 | | | | ENG 2 FAN BLADE 13 INSP |
| 704 | CLT | FRA | 1645 | 2045 | 277 | 278 | | SKD | | | | | |
| 68 | MIA | MAD | 1855 | 2255 | 7AW | 7AW | | SKD | 1600/08* | | | | P1 MEL AUTOLAND |
| 730 | CLT | LHR | 1905 | 2305 | 278 | 277 | | SKD | 2300/08* | | | | ATSU MOD |
| 24 | PHL | GLA | 1905 | 2305 | 5FA | 5FA | | SKD | | | | | R2 WINDOW DELAM |
| 1142 | MIA | JFK | 1930 | 2330 | 390 | 343 | | SKD | | | | | |

FIG. 6

610 → Equipment Status

| FLEET | TAIL | STATION | ETR | LINKED FLIGHTS | REMARKS |
|---|---|---|---|---|---|
| A330 | 275 | PHL | 1630/08 | 0758/08JUN 1630 | ENG 2 FAN BLADE 13 |
| A330 | 277 | CLT | 2300/08* | 0730/08JUN 1905 | ATSU MOD |
| A332 | 286 | PHL | 2000/08* | 0734/08JUN 2110 | P1 ANTENNA CHANGE |
| B772 | 7AW | MIA | 1600/08* | 0068/08JUN 1855 | *P1 MEL AUTOLAND |
| 7SEL | 5DK | MIA | 0400/09* | 0335/09JUN 0835 | LH ENG N3 TACH WIRNG |
| 7SEL | 5FF | DFW | D1600/08* | 0232/08JUN 2020 | LH FWD B/P C/B TRIP |
| 7SEL | 5FS | TUL | 2300/09* | | SKIN PUNCTURE DK 5C |
| 76RP | 389 | JFK | 2100/08 | | DATA CONCENTRATOR |
| 76RP | 399 | MIA | 1900/08 | 0991/08JUN 2245 | AC3 |
| 76RP | 392 | MIA | D1600/08* | 1571/09JUN 0700 | R-CTR TANK B/P INOP |
| 76RP | 350 | MIA | 0600/09* | | FUSE PUNCT AFT OF |
| 76RP | 379 | DWH | 1800/09 | | LH ENG IDG FEEDER |
| 772M | 7BG | JFK | D1400/08* | | *CR* URINE ODOR IN |
| 7878 | 8AB | ORD | 2000/08* | | AFT CX DOOR CHNGE |

FIG. 7

| Flagship Delay Notification | | | |
|---|---|---|---|
| Total Delay (mins) | 120 | | |
| Aircraft | 8LC | | |
| Flight | 40 | | |
| Departure City | ORD | | |
| Arrival City | BCN | | |
| Date | 1/9/2019 | | |
| SKDD | 2000 | | |
| Passengers | 230 | | |
| Total Connections | 23-30 | | |
| Misconnects | 24 | | |
| RON | NO | | |
| Rubbed Flights | YES | AA41/10 BCN-ORD | |
| | N8LC hasLeft ASG Generator on Placard-Unable to use on Aa40 flight-Swapped with N8LA | | |
| Maintenance | | | |
| Decision/ETR | YES | D2200/09 | |
| NFNF? | NO | | |
| Comm with MOM? | YES | | |
| Who? | ABC-ABC | | |
| Spares | | | |
| Spare/Move-up/Sub? | YES | Used N8LT | |
| Crews | | CA MOT | FO MOT |
| Crew Legality? | NO | 0100/10L | 0100/10L |
| Reserve Crew Available? | NO | | |
| Airport/Cusrtoms/Customers | | | |
| Delay Caused by Curfew/Customs? | NO | | |
| Customer Protection? | N/A | | |

655 — Send the Report    SAVE a COPY — 660

| 500 | 505 | 510 | 515 | 520 | 525 | 530 | 535 | 540 | 545 | 550 | 555 | 560 | | 565 | 570 | 575 | 580 | | 690 | |
|---|---|---|---|---|---|---|---|---|---|---|---|---|---|---|---|---|---|---|---|---|
| FLT | FROM | TO | SKD-L | SKD-Z | NEW TAIL | DELAY | STATUS | NEW ETR | CA MOT | FO MOT | FB MOT | CA FROM | FO FROM | PAX | CONNX | NOTES | Able to RON? | CURFEW? | SLOTTED? | CI |
| 40 | ORD | BCN | 2000 | 0200 | 8AL | 120 | ETD | 02200 | 0100L | 0100L | 0000L | HOME | HOME | 230 | 24 | | | | | 95 |

AIRLINE FLIGHT OPERATIONS SUPPORT

CROSS-REFERENCE TO RELATED APPLICATION

This application claims the benefit of the filing date of, and priority to, U.S. Application No. 62/685,565, filed Jun. 15, 2018, the entire disclosure of which is hereby incorporated herein by reference.

BACKGROUND

Generally, business entities store information across multiple applications and operating systems that access a variety of databases. For complex business entities, the volume of information and the variety of databases in which the information is stored is so large that accessing the information is burdensome or impossible. For example, airline carriers are responsible for planning and pricing routes, handling and tracking luggage, maintaining the aircraft, preparing the aircraft for use, managing gate availability, and staffing the flights with appropriate personnel, among many other tasks. Thus, information associated with the tasks is spread among multiple databases that are accessible via multiple applications. For example, the status of an aircraft is available via a first application managed by the airline. Meanwhile, information regarding the status of employees that are scheduled to use the aircraft is provided and tracked by a second application that is distinct from the first application. While both pieces of information are available online, or at least electrically accessible via a network, to access each requires an employee to know the location at which it is available. This requires the employee to identify the appropriate applications or database and then find the relevant information.

Finding the information often includes opening an application and then drilling down to a specific document or screen by clicking on folders, files, or selectable buttons until the relevant information is displayed. An alternative is a searching tool that searches the application. Conventional searching tools, however, generally return a listing of options to the user (e.g., employee) for their review and selection. For example, if a user does a field search, then they will receive multiple links to documents that might be relevant. The user is then required to know which document is correct, or click on every document and review each, to find the relevant information. That is, the burden of finding information is on the user.

Moreover, conventional searching tools generally search within one application. If the user is active in a first application and needs information from a second application, the user is generally required to open the second application and then perform a search within the second application. Alternatively, the information could be added to the first application, but that process requires the ingestion of the information by the first application and the development of new features within the first application, which is slow and creates potential problems with accuracy of information across applications.

BRIEF DESCRIPTION OF THE DRAWINGS

FIG. 5 is an illustration of a window displayed on the graphical user interface of FIG. 1, according to an example embodiment, wherein the window includes a report.

FIG. 6 is an illustration of another window displayed on the graphical user interface of FIG. 1, according to an example embodiment.

FIG. 7 is an illustration of yet another window displayed on the graphical user interface of FIG. 1, according to an example embodiment.

FIG. 8 is an illustration of a portion of the report of FIG. 5, according to an example embodiment.

FIG. 9 is an illustration of yet another window displayed on the graphical user interface of FIG. 1, according to an example embodiment.

DETAILED DESCRIPTION

Figure 1:
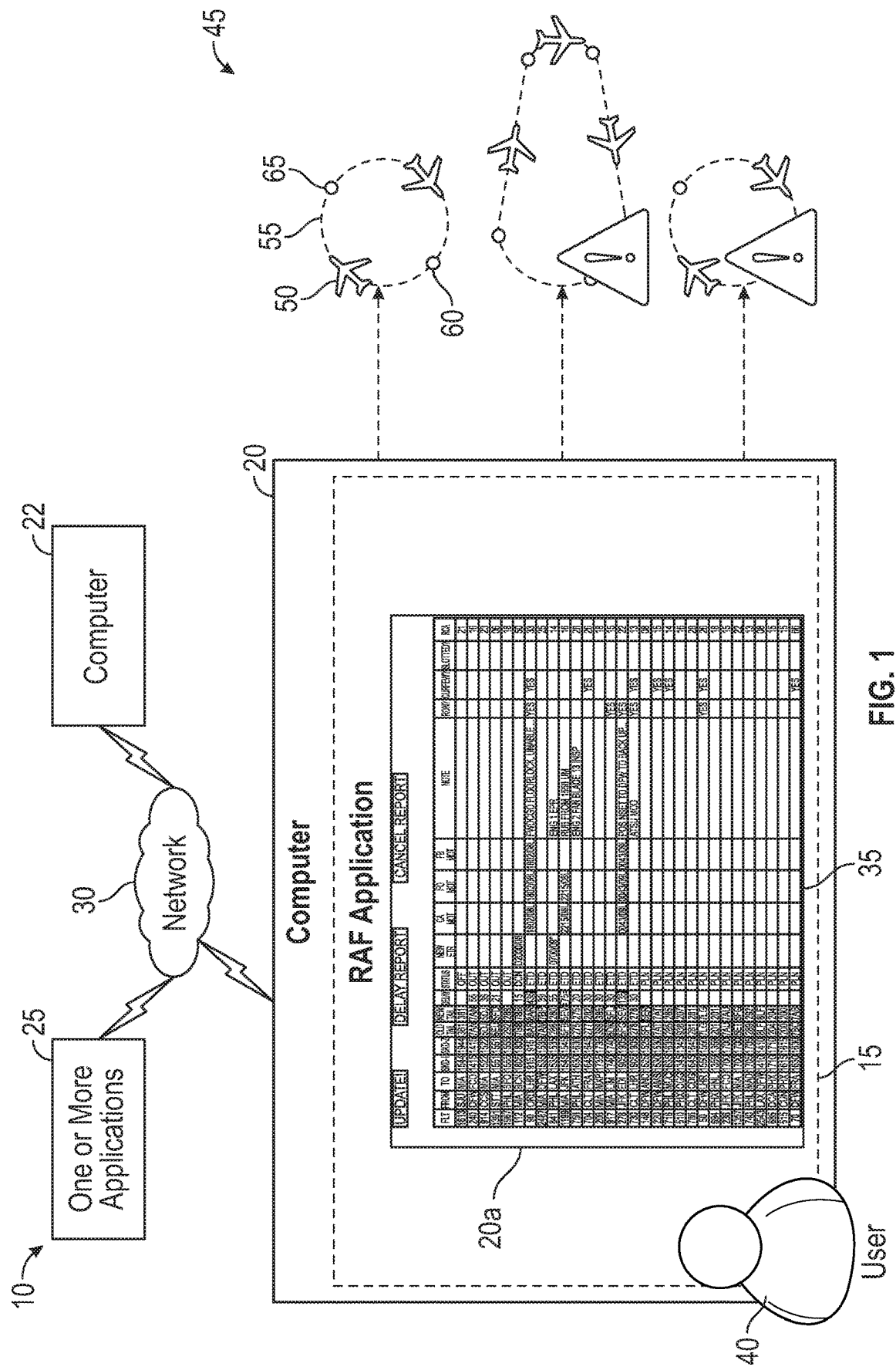
FIG. 1 is a diagrammatic illustration of a system that includes a computer having a graphical user interface adapted to display a window, according to an example embodiment.

In an example embodiment, referring to FIG. 1, a system 10 includes a RAF application 15 that is at least partially stored on a computer 20; a computer 22; and one or more applications 25 all of which are operably connected via a network 30. Generally, the RAF application 15 is configured to present a window 35 on a GUI 20a of the computer 20 to a user 40 of the computer 20.

In an example embodiment, the RAF application 15 is an application that accesses information within any one of the one or more applications 25 on behalf of the user 40. Generally, the RAF application 15 retrieves information regarding the maintenance and scheduling of an aircraft fleet 45 during flight operations. Specifically, the RAF application 15 manages the maintenance and scheduling of an aircraft 50 that is associated with a flight path 55, flight duration, and other flight details for the aircraft 50 as it leaves a departure location 60 and arrives at a destination location 65. The RAF application 15 retrieves the information in multiple ways, for example searching through files (e.g., WebRef) stored within the one or more applications 25 and retrieving information from one or more databases. The RAF application 15 is capable of operating across the one or more applications 25. In some embodiments, one portion of the RAF application 15 is stored in the computer 20 and another portion is stored in the computer 22.

Figure 2:
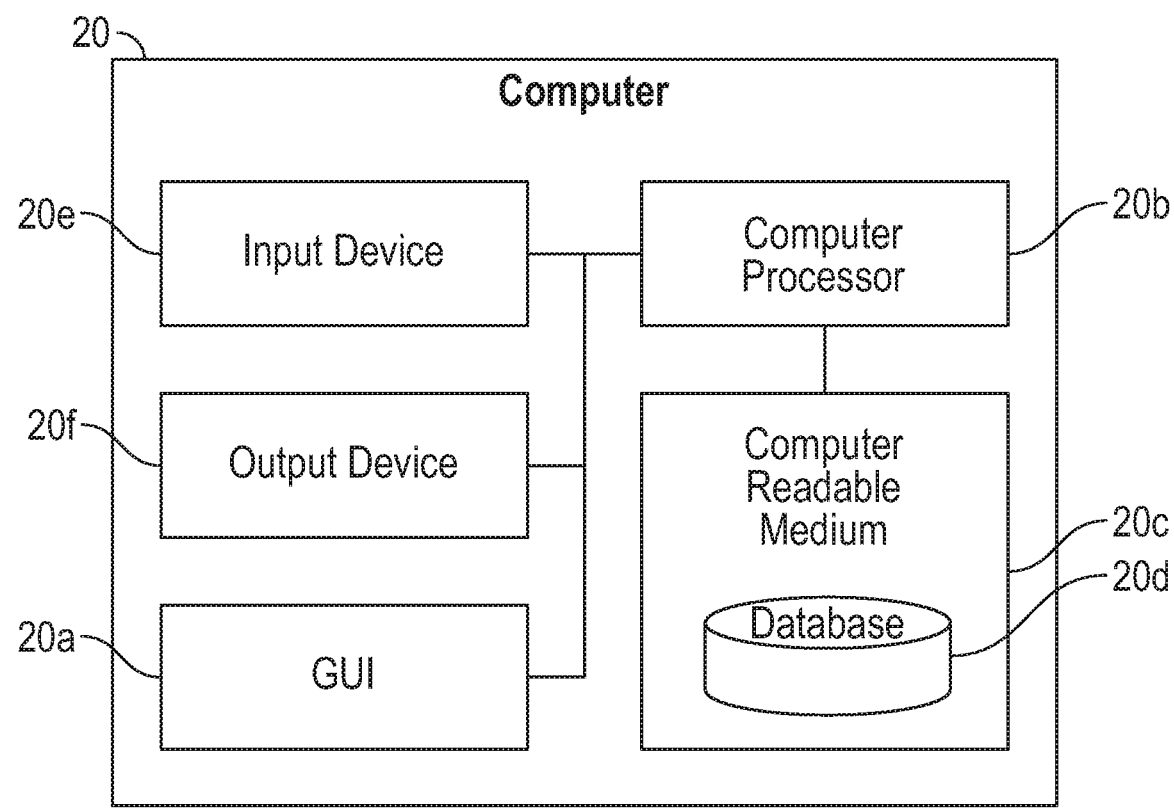
FIG. 2 is a diagrammatic illustration of the computer of FIG. 1, according to an example embodiment.

In an example embodiment, as illustrated in FIG. 2 with continuing reference to FIG. 1, the computer 20 includes the GUI 20a, a computer processor 20b, and a computer readable medium 20c operably coupled thereto. Instructions accessible to, and executable by, the computer processor 20b are stored on the computer readable medium 20c. A database 20d is also stored in the computer readable medium 20c. Generally, the GUI 20a is capable of displaying a plurality of windows, or screens, to the user 40. The computer 20 also includes an input device 20e and an output device 20f. In some embodiments, the input device 20e and the output device 20f are the GUI 20a. In some embodiments, the user 40 provides inputs to the system 10 via the window or screen 35 that is displayed on the GUI 20a. However, the input device 20e is a microphone in some embodiments and the output device 20f is a speaker. In several example embodiments, the computer 20 is, or includes, a telephone, a personal computer, a personal digital assistant, a cellular telephone or mobile phone, other types of telecommunications devices, other types of computing devices, and/or any combination thereof. In several example embodiments, the computer 20 includes a plurality of remote user devices.

In some embodiments, the computer 22 is similar or identical to the computer 20 but is remote from the computer 20 and therefore reference numerals used to refer to the features of the computer 22 that are substantially identical to the features of the computer 20 will correspond to the reference numerals used to refer to the features of the computer 20 except that the prefix for the reference numerals used to refer to the features of the computer 20, that is, 20, will be replaced by the prefix of the computer 22, that is, 22.

Figure 3:
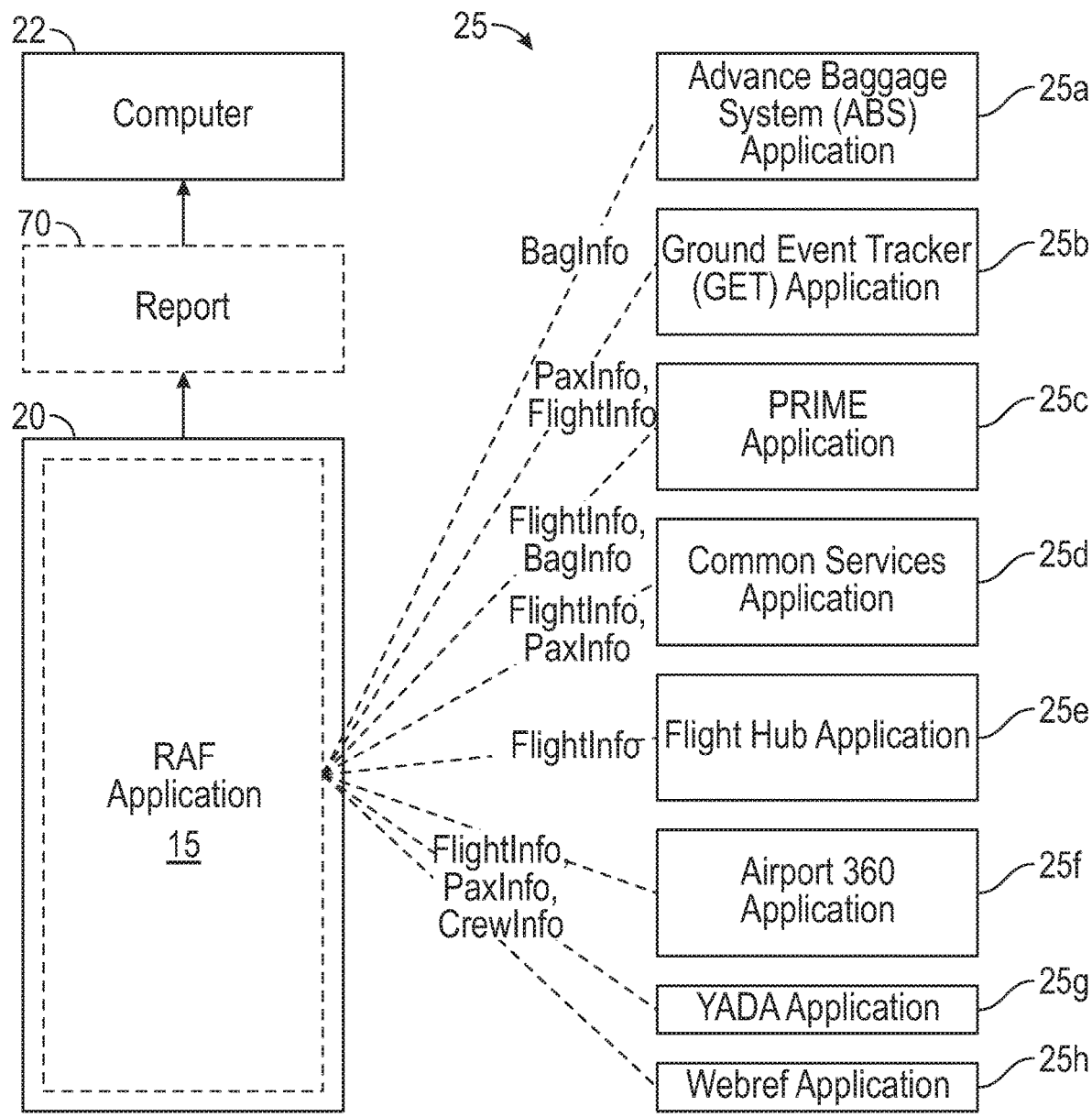
FIG. 3 is a data flow diagram for the system of FIG. 1, according to an example embodiment.

In an example embodiment, and as illustrated in FIG. 3, the RAF application 15 is in communication with the one or more applications 25. In some embodiments, the one or more applications 25 include a first application such as an advance Baggage System Application (ABS) 25a; a second application such as a Ground Event Tracker Application (GET) 25b; a third application such as a PRIME Application 25c; a fourth application such as a Common Services Application 25d; a fifth application such as a Flight Hub Application 25e; a sixth application such as an Airport 360 Application 25f; a seventh application such as a YADA application 25g; and an eighth application such as a Webref Application 25h, among others. In one embodiment, the ABS application 25a stores and manages bag information; the GET application 25b stores and manages passenger info and flight information; the PRIME application 25c stores and manages flight information and bag information; the Common Services Application 25d stores and manages flight information and bag information; the Flight Hub application 25e stores and manages flight information; the Airport 360 Application 25f stores and manages flight information, passenger information, and crew information, the YADA application 25g stores and manages data relating to boarding passes, flights, and standby lists; and the Webref application 25h stores and manages (e.g., access on demand) information stored in or at a webreference. In an example embodiment, each of the applications 25a-25h is stored in a computer similar to the computer 20 in that it includes a processor, computer readable medium, and a database. In some embodiments, each of the applications 25a-25h accesses information from a data source that forms a portion of the one or more applications 25. However, in other embodiments, one or more of the applications 25a-25h access information from a data source that is separate from and apart from the applications 25a-25h. In some embodiments, more than one application accesses information from one data source.

Together, FIGS. 4A-4F illustrate a method 200 of using the RAF application 15 and/or the system 10. Starting with FIG. 4A, the method 200 includes the user 40 logging into the RAF application 15 at step 202; checking flight numbers and departure/destination airports at step 205; looking up scheduled departure times at step 210; looking up tail information at step 215; comparing the tail information for changes at step 220; determining whether the tail number has changed at step 225; if yes, providing a visual indication on the GUI 20a at step 230; if not or after the step 230; capturing delay information at step 235; checking the flight status and adding remarks as necessary at step 240; and looking up the out of service ("OTS") status of a fleet at step 245.

Figure 4A:
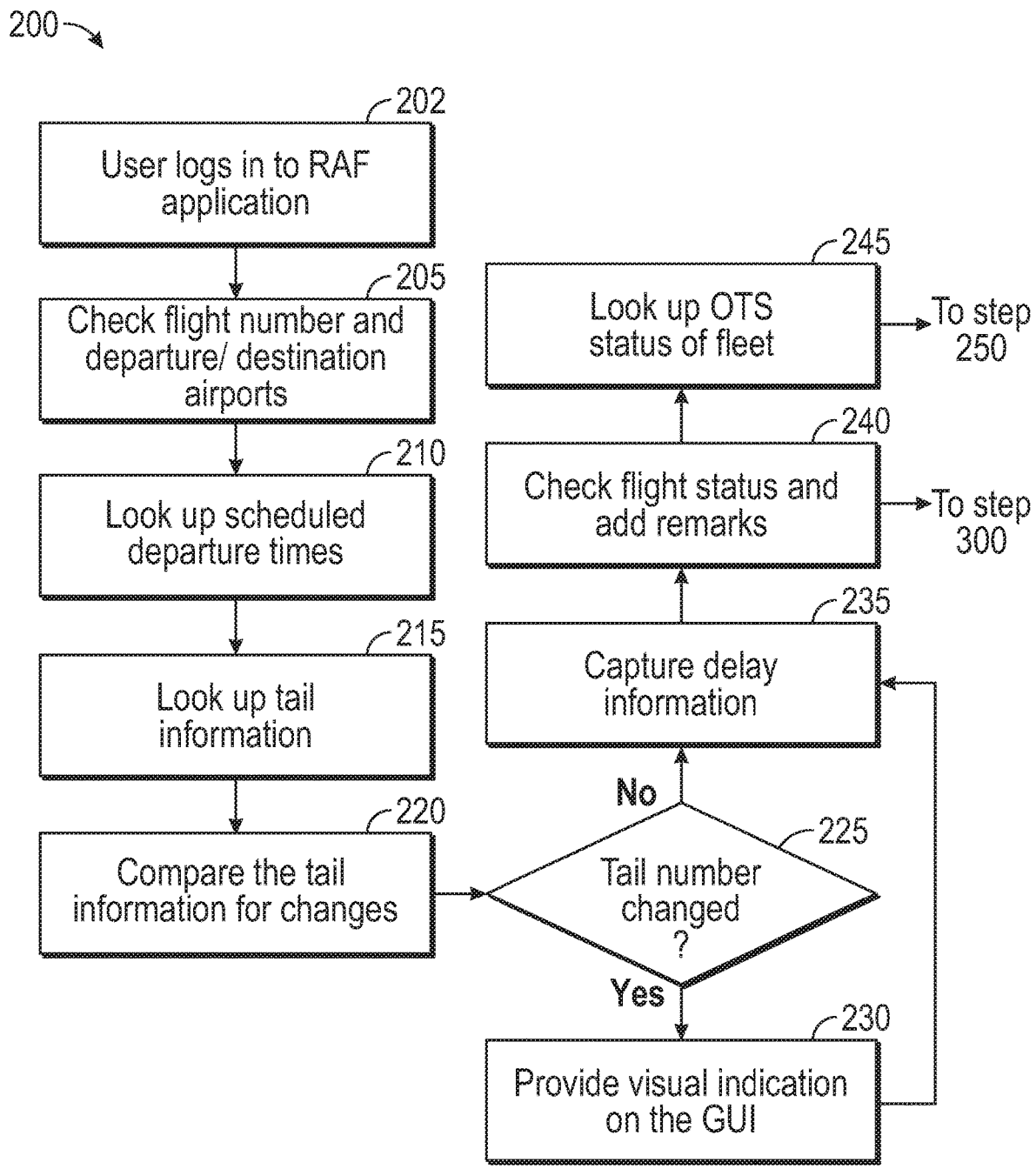
FIGS. 4A, 4B, 4C, 4D, 4E, and 4F together form a diagrammatic illustration of a method of operating the system of FIGS. 1-3, according to an example embodiment.
Figure 4B:
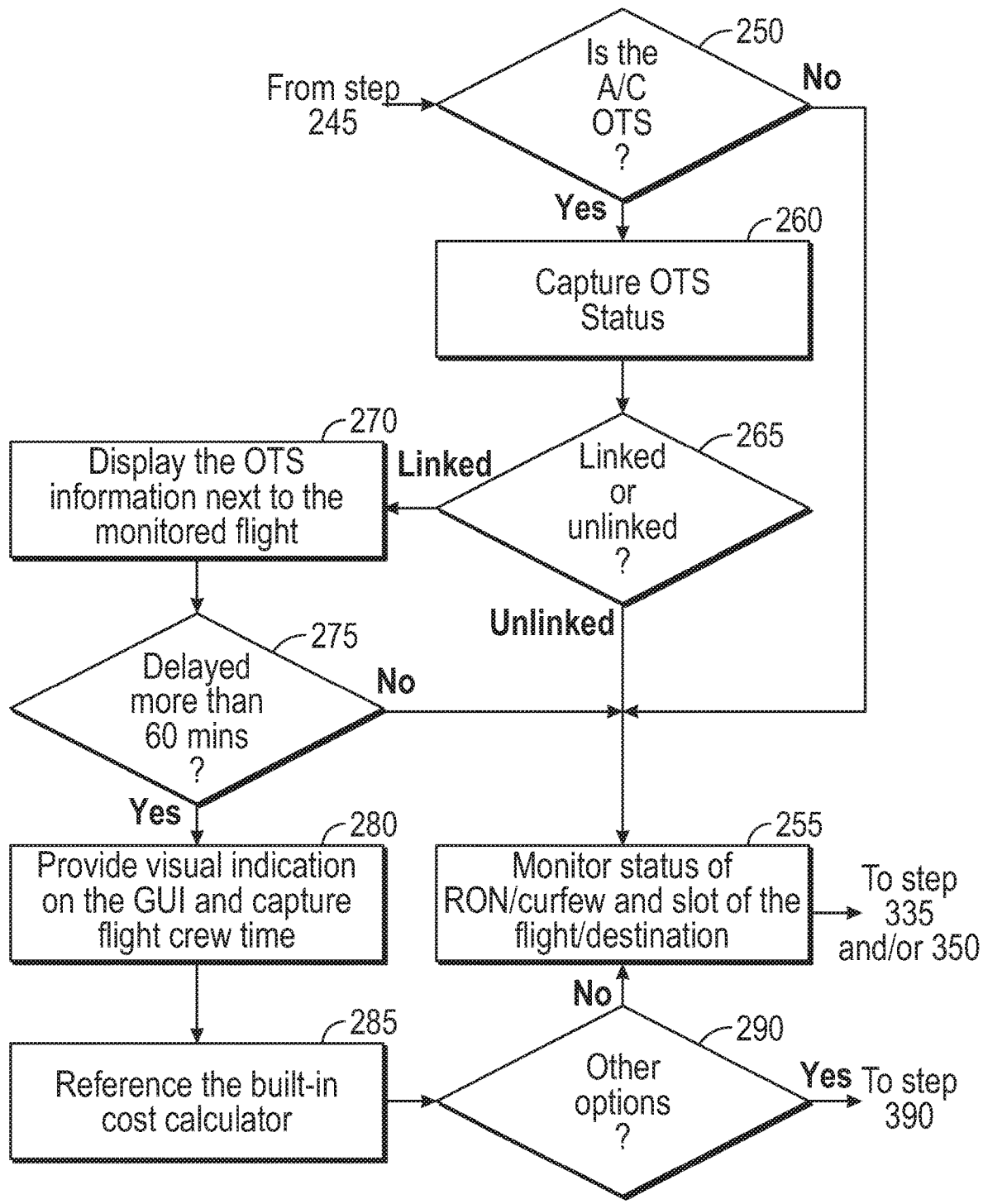

Turning to FIG. 4B and after the step 245 (shown in FIG. 4A), the method 200 also includes the RAF application 15 determining if a monitored aircraft is OTS at step 250; if not then the RAF application 15 monitors a status of a RON/Curfew and a slot of the flight/destination at step 255; if it is determined that the monitored aircraft is OTS at step 250 then the RAF application 15 captures the OTS status at step 260 and determines whether the aircraft is linked or unlinked at step 265; if it is unlinked, then the next step is step 255; if it is linked then the RAF application 15 displays the OTS information next to the monitored flight at step 270. The method 200 also includes, after the step 270, determining whether the delay is more than 60 minutes at step 275; if not, then the next step is the step 255; if the delay is more than 60 minutes, then the method 200 includes providing a visual indicator on the GUI 20a and capturing flight crew time at step 280; highlighting the built-in cost calculator at step 285; and determining if there are other options at step 290. If there are no other options, then the next step is the step 255. If there are other options, then the next step is the step 390.

Figure 4C:
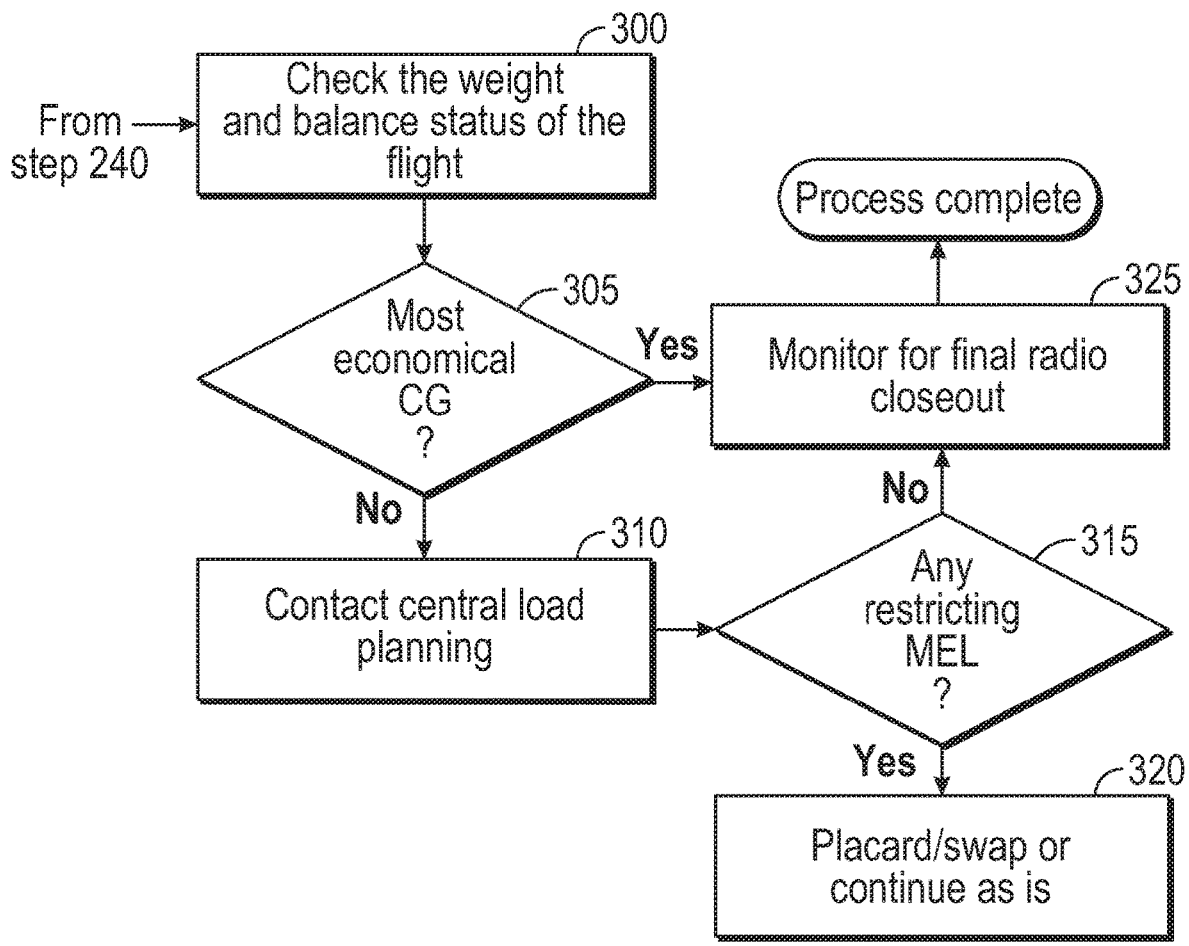

Turning to FIG. 4C and after the step 240 (shown in FIG. 4A), the method 200 includes checking the weight and balance status of the flight at step 300; determining if the center of gravity ("CG") is the most economical at step 305; if no, then contacting central load planning at step 310; after the step 310, the method 200 includes determining whether there is a restricting minimum equipment list ("MEL") at step 315; if yes, then a placard/swap is performed or the system 10 continues as is at step 320. If it is determined that there is not a restricting MEL at step 315 or if it is determined that the CG is the most economical at the step 305, then the next step is monitoring for final radio closeout at step 325 and the method 200 is completed.

Figure 4D:
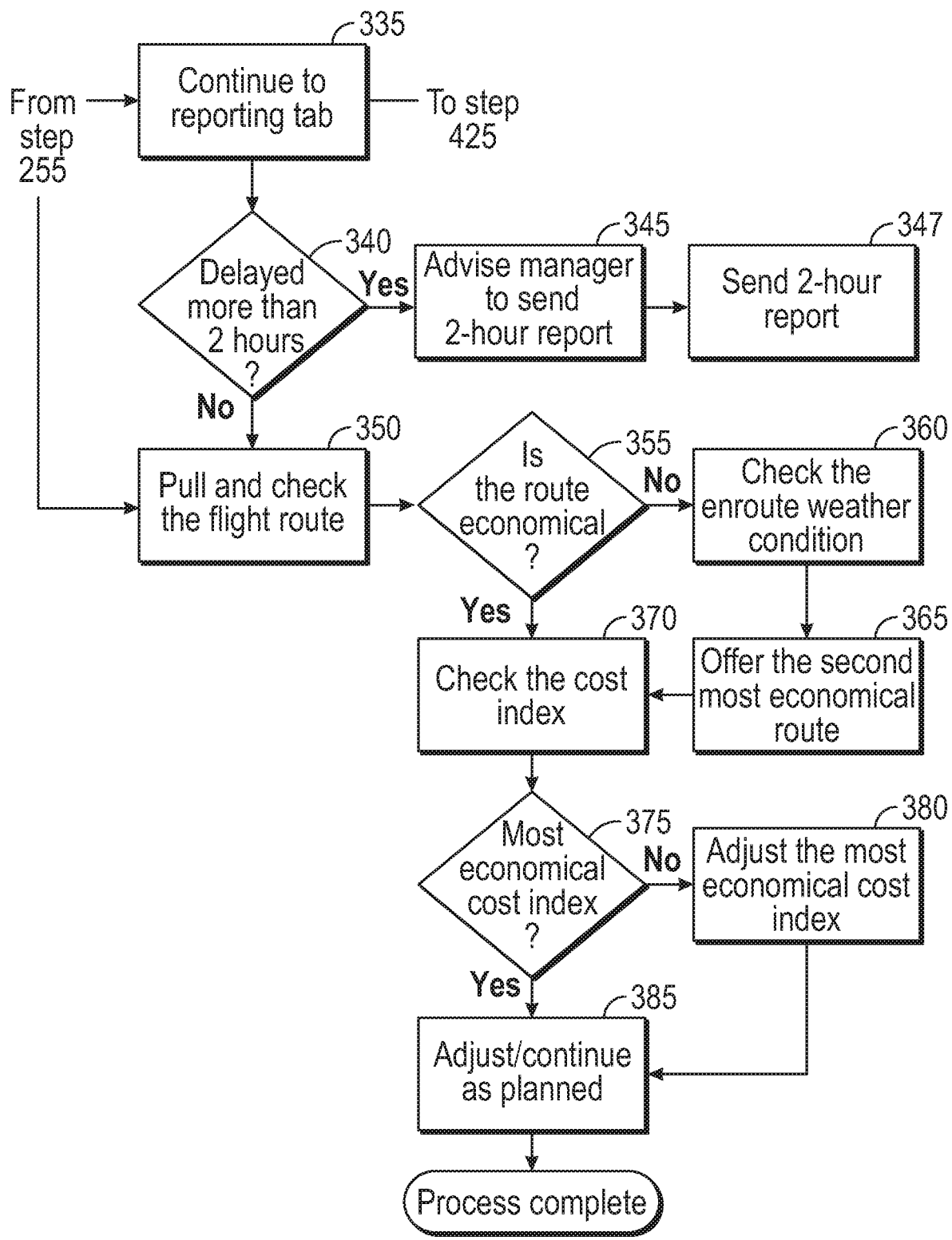

Turning to FIG. 4D and after the step 255 (shown in FIG. 4B) the method 200 includes continuing to the reporting tab at step 335; determining whether the flight is delayed more than two hours at step 340; if yes, then advising a manager to send the two-hour report at step 345 and then sending the report at step 347; if no, and/or after the step 255, pulling and checking the flight route at step 350. After the step 350, the method 200 includes determining whether the route is economical at step 355; if no, then checking the enroute weather condition at step 360 and then offering the second most economical route at step 365. After the step 365 or after the it is determined that the route is economical at the step 355, the method 200 includes checking the cost index at step 370; determining whether the cost index is the most economical at step 375; if no, then advising the most economist cost index at step 380, and then adjusting/continuing as planned at step 385. In some embodiments, if it is determined that the cost index is the most economical at the step 375, then the next step is the step 385.

Figure 4E:
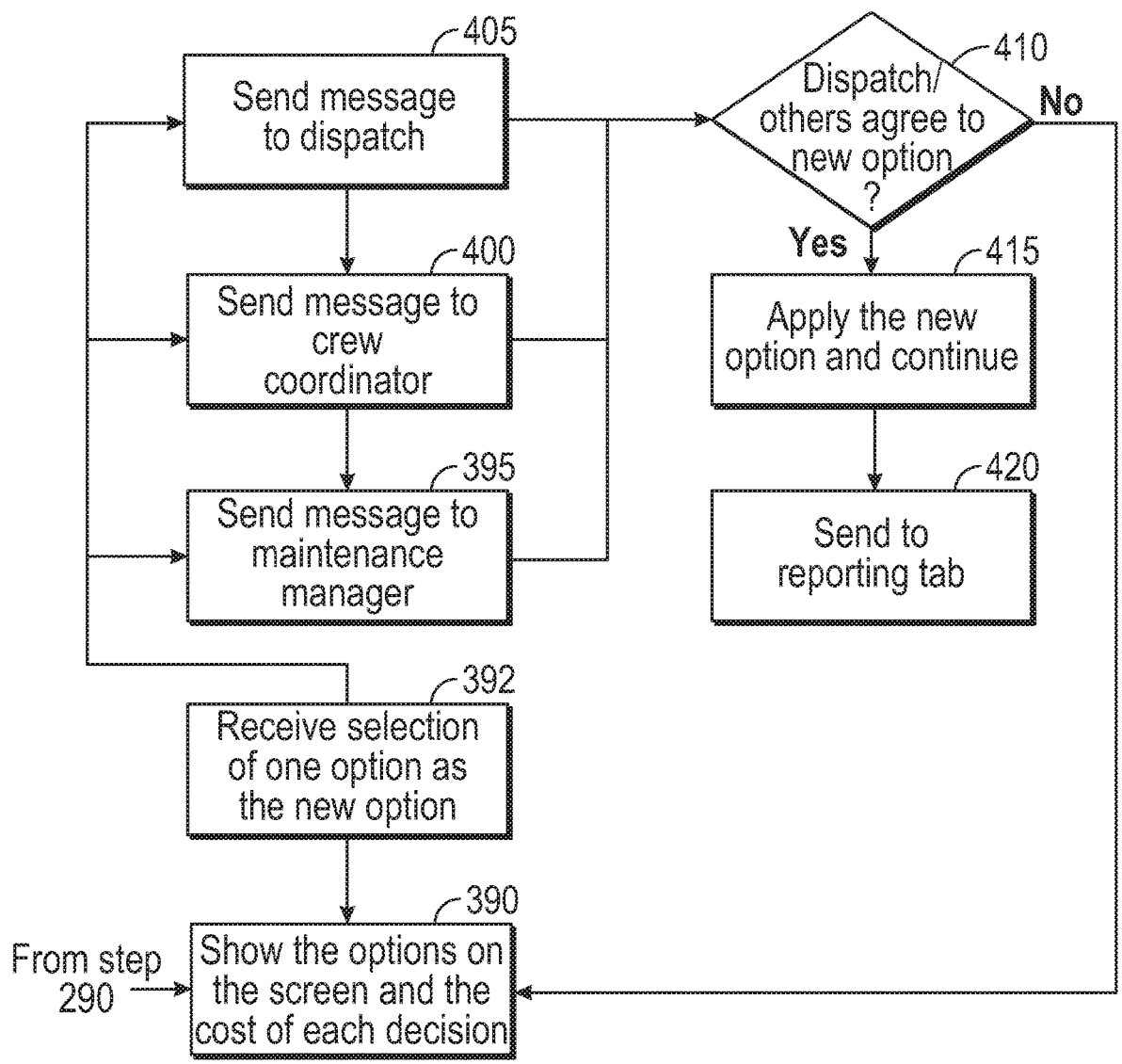

Turning to FIG. 4E and after the step 290 (shown in FIG. 4B), the method 200 includes showing the options on the GUI 20a and the cost of each decision at step 390; receiving selection of one option as the new option at step 392; and sending a message to the maintenance manager at step 395; sending a message to the crew coordinator at step 400; and/or sending a message to dispatch at step 405. After any or all of the steps 395, 400, and 405, the method 200 includes determining whether the dispatch/others agree to the new option at step 410; if yes, then applying the new option and continuing at step 415 and sending the new option to the reporting tab at step 420; and if dispatch/others do not agree to the new option at the step 410, then returning to the step 390.

Figure 4F:
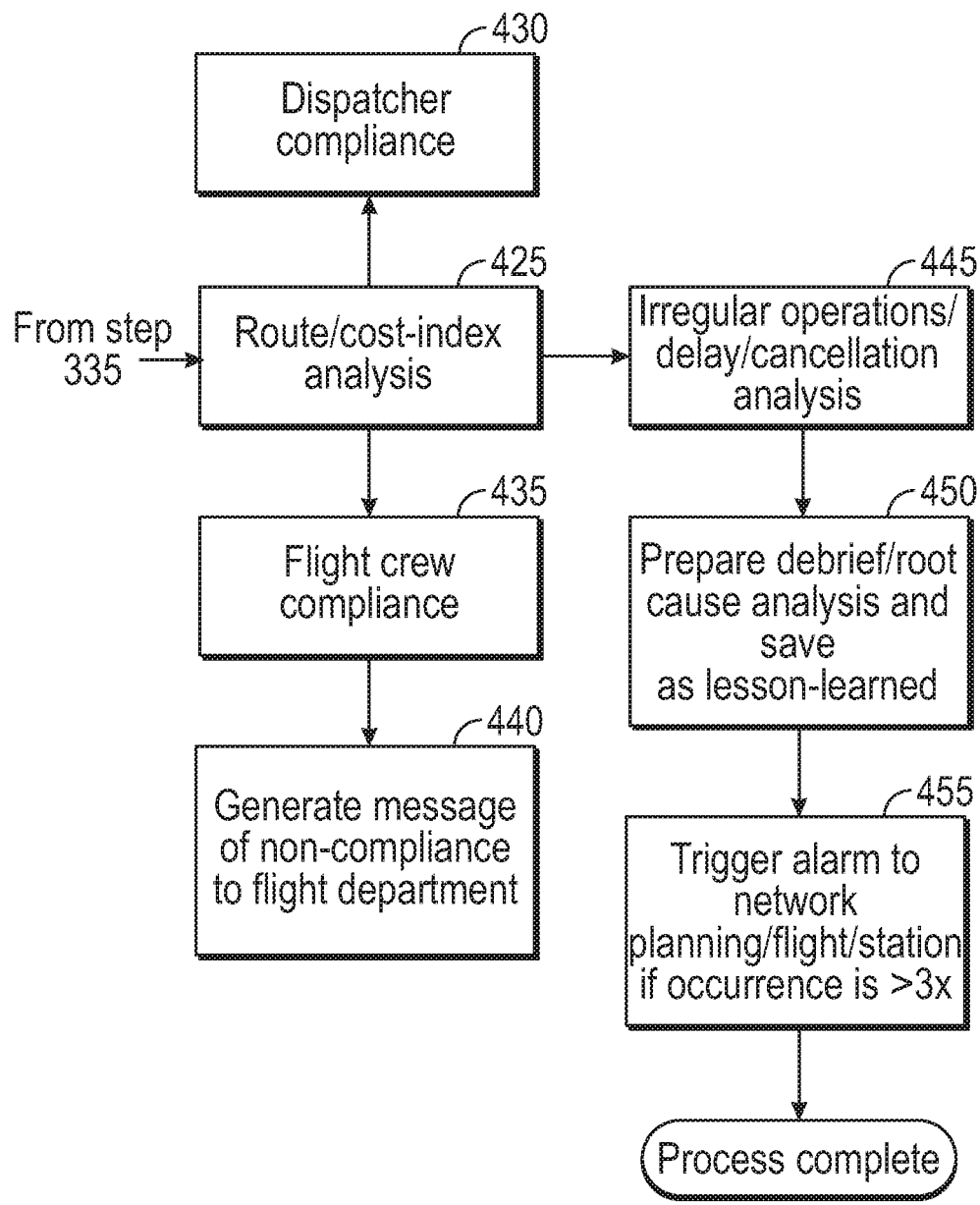

Turning to FIG. 4F and after the step 335 (shown in FIG. 4D), the method 200 includes routing the cost-index analysis at step 425 and then checking dispatcher compliance at step 430; checking flight crew compliance at step 435 and then generating a message of non-compliance to flight department at step 440. Moreover, after the step 425 the method 200 also includes performing an irregular operations/delay/cancellation analysis at step 445; preparing debrief and/or root cause analysis and saving it as a lesson-learned at step 450; and triggering an alarm to network planning/flight/station if occurrence is greater than a predetermined amount, such as three times at step 455 and the method 200 is completed.

At the step 202 and returning back to FIG. 4A, the user 40 logs into the RAF application 15. In some embodiments, the step 202 includes the RAF application 15 receiving a user identifier and an authentication identifier. In some embodiments, one or more of the one or more applications 25 are configured to require receipt of a first user identifier and a first authentication identifier to allow the user 40 to gain direct access to information within the application. That is, the user 40 is generally required to login to each, or at least more than one, of the applications 25*a*-25*h*. After the system 10 receives the first authentication identifier and the first user identifier, the user 40 is provided direct access to the RAF application 15. That is, the user 40 is permitted to view information within the application 15 via windows associated with the application 15. In some embodiments, the first user identifier is a username, and the first authentication identifier is a password. Generally, gaining direct access relates to the ability to open the application and view the information as it is displayed in the application. In other embodiments, the gaining direct access to an application includes the ability to maneuver or control the display of screens associated with the application.

Figure 5:
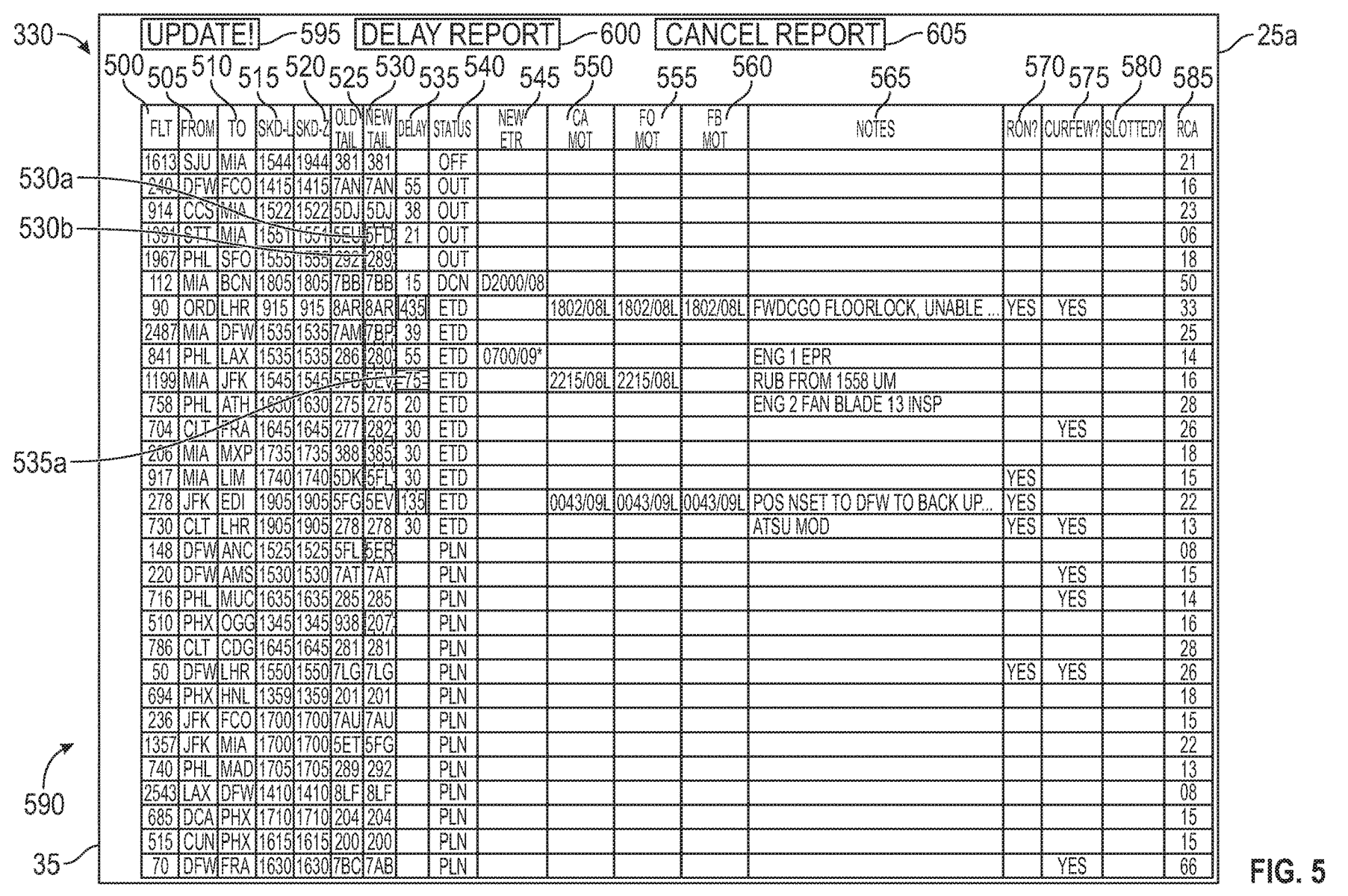

At the step 205, the RAF application 15 checks the flight number and departure/destination airports. In some embodiments, the RAF application 15 accesses the flight number and departure/destination airports from a first application from the one or more applications 25. In some embodiments, the RAF application 15 displays the screen 35 on the GUI 20*a* as illustrated in FIG. 5, a screen 460 as illustrated in FIG. 6, and/or a screen 465 illustrated in FIG. 7. In some embodiments, the screen 35 includes a flight summary report 330 that includes a "FLT" column 500 listing flight numbers, a "FROM" column 505 that coincides with an origination location, a "TO" column 510 that coincides with a destination location, a "SKD-L" column 515 indicating a scheduled departure time, a "SKD-Z" column 520 indicating a scheduled arrival time, an "Old Tail" column 525, a "New Tail" column 530; a "Delay" column 535, a "Status" column 540; a "New ETR" column 545 that indicates a new estimated time of return, a "CA MOT" column 550, a "FO MOT" column 555, a "FB MOT" column 560, a "Notes" column 565, a "RON?" column 570, a "Curfew?" column 575, a "Slotted?" column 580, and a "RCA" column 585 for each flight in a listing of flights 590. Moreover, the screen 35 includes a selectable "Update" button 595 associated with updating the information displayed in the columns 500-585 and/or the listing of flights 590, a "Delay Report" button 600 associated with creating a delay report, and a selectable "Cancel Report" button 605 associated with cancelling a report. As illustrated, the flight number is detailed in the "FLT" column 500, and the departure/destination airports are detailed in the "FROM" column 505 and the "TO" column 510.

In some embodiments, the screen 460 (FIG. 6) includes a flight delay summary report 607 that includes the "FLT" column 500, the "FROM" column 505, the "TO" column 510, the "SKD-L" column 515, the "SKD-Z" column 520, the "Old Tail" column 525, the "New Tail" column 530; the "Delay" column 535, the "Status" column 540; the "New ETR" column 545, the "CA MOT" column 550, the "FO MOT" column 555, the "FB MOT" column 560, and the "Notes" column 565. Generally, the flight delay summary report 607 is similar to the flight summary report 330 except the flight delay summary report 607 is limited to flights that have been delayed, are delayed, or have been delayed on one day while the flight summary report 330 includes all flights on one day. That is, the listing of flights 590 listed in the report 607 are limited to flights that have been delayed, are delayed, or have been delayed on one day.

In some embodiments, the screen 465 (FIG. 7) includes an equipment status report 610 that includes a "Fleet" column 615, a "Tail" column 620, a "Station" column 625, an "ETR" column 630, a "Linked Flights" column 635, and a "Remarks" column 640. Generally, the equipment status report 610 includes a listing of aircraft 645 and a status of each and/or a listing of aircraft subject to an existing, past, or potential delay.

At the step 205 and in one embodiment, the RAF application 15 populates and/or updates the FLT column 500, the FROM column 505, and the TO column 510.

At the step 210, the RAF application 15 looks up the scheduled departure times. In some embodiments, the RAF application 15 accesses the scheduled departure times via a second application from the one or more applications 25, with the second application being different from the first application. In some embodiments, the RAF application 15 displays the scheduled departure times in the column SKD-L column 520 on the screen 35.

At the step 215, the RAF application 15 looks up tail information. In some embodiments, the RAF application 15 access the tail information via a third application from the one or more applications 25, with the third application being different from the first and/or second application. In some embodiments, the RAF application 15 displays the tail information in the Old Tail column 520 and/or the New Tail column 525. In some embodiments and at the step 215, the RAF application 15 populates the Old Tail column with the tail numbers in the New Tail column 525 and then displays the new tail information in the New Tail column 525.

At the step 220, the RAF application 15 compares the tail information for changes. In some embodiments, the RAF application 15 compares the tail information to the tail information via a fourth application from the one or more applications 25. However, in other embodiments, the RAF application 15 compares the information in the New Tail column 525 to the information in the Old Tail column 520 to compare the tail information.

At the step 225, the RAF application 15 determines whether the tail number has changed. In some embodiments, the determination includes a comparison between the two sets of tail numbers—an existing or old tail number in column 520 and a new or updated tail number in column 525.

At the step 230 and when the tail number has changed, the RAF application 15 provides a visual indication on the GUI 20*a*. In some embodiments and as illustrated in FIG. 5, the RAF application 15 highlights a cell, such cells 530*a* and 530c, or the new tail number listed in the new tail column 525 to provide a visual indication on the GUI 20a. The data within a highlighted cell can be bolded, the background of the cell can be hatched or highlighted, or another visual indicator can be provided.

At the step 235, the RAF application 15 captures delay information. In some embodiments, the RAF application 15 accesses and captures delay information via a fifth application that is different than one or more of the first, second, third, and fourth applications. In some embodiments, the RAF application 15 displays the number of minutes associated with a delay of a flight, such as for example as illustrated in cell 535a. As illustrated, flight number 1199 has a delay of 75 minutes.

At the step 240, the RAF application 15 checks the flight status and displays a status in the "STATUS" column 535. In some embodiments, the RAF application 15 looks up the flight status via a sixth application from the one or more applications 25. For example, the status for the flight number 1199 is ETD or "Estimated Time of Departure." However, other statuses include "OFF"; "OUT"; "DCN", and "PLN", which indicates a planning advisory.

At the step 245, the RAF application 15 looks up the out of service (OTS) status of all aircraft, such as all aircraft within a widebody fleet. In some embodiments, the RAF application 15 looks up information relating to OTS aircraft via a seventh application from the one or more applications 25.

Turning back to FIG. 4B and after the step 245, the RAF application 15 determines if each, or at least one aircraft, is out of service at the step 250. As noted above and in some embodiments, the RAF application 15 looks up the information relating to OTS aircraft using the seventh application.

At the step 255, the RAF application 15 monitors the status of RON/Curfew and slot of the flight/destination. In some embodiments, the RAF application 15 looks up information regarding the RON/Curfew in an eighth application from the one or more applications 25.

At the step 260, and if the aircraft is OTS at the step 250, the RAF application 15 captures the OTS status.

At the step 265, the RAF application 15 determines if the monitored aircraft is linked or unlinked. In some embodiments, the monitored aircraft being linked or unlinked relates to whether it is required the aircraft is scheduled to be used for a different flight that departs from its scheduled destination location. In some embodiments, the RAF application 15 determines if the monitored aircraft is linked or unlinked using an application from one of the plurality of applications 25. If the monitored flight is not linked or unlinked, then the next step is the step 255.

At the step 270 and when the monitored aircraft is linked, then the RAF application 15 displays the OTS information next to the monitored flight. For example and as illustrated in the screen 465 of FIG. 7, the OTS information is displayed in the "Remarks" column 640.

At the step 275, the RAF application 15 determines whether the flight has been delayed for more than 60 minutes. In some embodiments, the RAF application 15 determines whether the flight has been delayed for more than 60 minutes by accessing one application in one of the one or more applications 25 and/or referencing the data in the "delay" column 535 of the screen 35 illustrated in FIG. 5.

At the step 280, the RAF application 15 provides a visual indication relating to the delay on the GUI 20a and captures flight crew time. As illustrated in FIG. 5, one example of providing a visual indication is by highlighting a cell red when the delay exceeds 60 minutes. For example and as illustrated in FIG. 5, the flight 1199 has a delay of 75 minutes and the cell 535a is highlighted red. However, other types of visual indicators may be used, such as for example a bolded text, etc. In some embodiments, the RAF application 15 access the flight crew time and populates the CA MOT column 550, the FO MOT column 555, and FB MOT column 560. In some embodiments, the RAF application 15 accesses the flight crew time via one or more of the applications 25.

At the step 285, the RAF application 15 references the built-in cost calculator. In some embodiments, the cost calculator calculates the cost associated with a flight. For example, the calculator may calculate the cost associated with the crew, maintenance, aircraft depreciation, marketing and advertising, airport fees, etc. associated with a flight or a delayed flight. As the delay increases, costs associated with delaying connecting flights and any ripple effects caused by the delay are calculated. For example, the cost of a significant delay may include a cost associated with providing travel vouchers to specific or all passengers, providing accommodations to specific or all passengers, airport fees for arriving close to an airport curfew, etc. Another example cost is associated with replacing a scheduled crew with a stand-by or reserve crew or swapping the scheduled crew with another crew.

At the step 290, the RAF application 15 determines whether there are other options. For example, the RAF application 15 may determine, via an application in the plurality of applications 25, that a crew replacement is available past MOT time in case a crew replacement becomes necessary and recommends the option of replacing the crew. Another example of an option is for the RAF application 15 to provide contingency travel plans to the passengers, such as rebook them on a different flight or a partnering airline, via one or more of the application in the plurality of applications 25.

Turning back to FIG. 4C and after the step 240, the RAF application 15 checks the weight and balance status of a monitored flight at the step 300. In some embodiments, the RAF application 15 checks the weight and balance status via one application from the one or more applications 25.

At the step 305, the RAF application 15 determines whether the center of gravity ("CG") is most economical. In some embodiments, the RAF application 15 determines whether the CG is most economical via one application from the one or more applications 25.

At the step 310 and when the CG is not the most economical, the RAF application 15 contacts central load planning. In some embodiments, the RAF application 15 automatically sends an email, text, or other communication to a contact in central load planning to alert central load planning that the CG is not the most economical.

At the step 315, the RAF application 15 determines if there is a restricting minimum equipment list ("MEL"). In some embodiments, the RAF application 15 accesses an application from the one or more applications 25 during the step 315.

At the step 320, the RAF application 15 performs a placard/swap or continues as is. At the step 320 and when there is a restricting MELs that are inoperative, an inoperative placard should be placed near the appropriate switch, etc. During the step 320, the RAF application 15 indicates that a placard should be placed or the aircraft should be swapped at the step 320.

At the step 325, the RAF application 15 monitors for final radio closeout. Generally, the step 325 occurs after the RAF application 15 determines that the CG is the most economical at the step 305 or after determining that there are no restricting MELs at step 315. In some embodiments, the final radio closeout is an indication that the aircraft has cleared the terminal and/or airport. In some embodiments, the RAF application 15 monitors for final radio closeout relating to a flight or aircraft via one application in the one or more applications 25.

Turning back to FIG. 4D and after the step 255, the RAF application 15 continues to a reporting tab at step 335.

At the step 340, the RAF application 15 determines whether a monitored flight is delayed more than two hours via the one or more applications 25.

At the step 345 and when the monitored flight is delayed more than two hours, the RAF application 15 advises a manager to send a 2-hour report or a delay notification 70 as illustrated in FIG. 8. In some embodiments, the RAF application 15 generates an alarm, which may include a pop-up screen, an audible alarm, a visual alarm, a haptic alert, etc. In some embodiments, the delay report 70 is generated upon the user selecting the button 600 (shown in FIG. 5). In some embodiments, the report 70 is generated and displayed in response to the computer 20 receiving an indication that the user selected the button 600 while a specific flight from the listing of flights 590 is also selected. Generally, the report 70 is displayed via a screen 650 of the GUI 20a.

At the step 347, the RAF application 15 sends the report 70. Once the report 70 is finalized with all the required/necessary information, the user 40 presses a selectable "Send the Report" button 655 that instructs the system 10 to send the report 70 to the intended recipients. In some embodiments, the report 70 includes fillable text boxes to receive inputs from the user 40. In some embodiments, one or more department analysts are intended recipients of the report 70 so that they can look deeper into the root cause of the issue that caused the delay. In order to keep the record of all delayed flights, the user 40 also presses the selectable "Save a Copy" button 660 in order to save the details of the report to the database 20d. In some embodiments, the department analysts also have access to the database 20d for a monthly root cause analysis. Generally, the RAF application 15 accesses the saved copies of the delay notifications or reports 70 and spots trends relating to fleets, stations, aircraft, and flight-specific events. The steps 345 and 247 are also completed for any cancellation of a flight. Generally, the report 70 details the total delay in minutes, the aircraft, flight, departure and arrival cities, the date, the scheduled departure time, the number of passengers, the number of total connections, the number of misconnects, whether it will remain overnight "RON", whether it is associated with any rubbed flights, includes a remarks portions, and includes a maintenance, spares, crews, and airport/customs/customers portions.

At the step 350 and returning to FIG. 4D, which occurs when the RAF application 15 determines that the monitored flight is not delayed more than two hours and/or after the step 255, the RAF application 15 pulls and checks the flight route using one application from the one or more applications 25.

At the step 355, the RAF application 15 determines if the route is economical. Generally, the RAF application 15 accesses information and/or data within one application from the one or more applications 25 during the step 355.

At the step 360 and when the route is not economical, the RAF application 15 checks the enroute weather condition. Generally, the RAF application 15 accesses information and/or data within one application from the one or more applications 25 during the step 360.

At the step 365, the RAF application 15 offers the second-most economical route. Generally, the RAF application 15 accesses information and/or data within one application from the one or more applications 25 during the step 365.

At the step 370 and after the step 365 and/or when the route is economical at the step 360, the RAF application 15 checks the cost index.

At the step 375, the RAF application 15 determines if the cost index is the most economical. A portion of an embodiment of the flight summary report 330 is illustrated in FIG. 9. The portion of the flight summary report 330 illustrated in FIG. 9 provides details relating to flight 40, such as a cost index ("CI"). In this example, flight 40 has a CI of 95 listed in a column 690 labeled CI. In some embodiments, the CI is a number given to the Aircraft Flight Management System (FMS) to help it determine which is more important for the airline: Fuel or Time. The concept of cost, value or money, is represented as a digit (CI) and enter into the FMS. In some embodiments, the airplane or pilots adjust the flight speed based on the CI. That is, the CI is a number that optimizes the speed of the airplane to meet the airline's operations needs. CI is the ratio of the cost of time to the cost of fuel. The higher the cost of time, the higher the value of CI and vice versa. In other words, when a user inputs a higher number of CI into the FMS, it represents that the value of time is higher than the value of fuel for the airline, so the flight speed increases to meet the airline's time constraints. Conversely, when a lower CI number is entered in the FMS, it means the value of fuel is higher than time for the airline, hence the flight speed is lowered to burn less fuel. Generally, there are multiple direct and indirect factors affecting the cost of time for an airline. For instance, cost of crew, maintenance, aircraft depreciation, marketing and advertising, airport fees and so on are all affecting factors. The RAF application 15 automatically calculates all factors in the background, and depending on the situation, it suggests a higher or lower CI number than appears on a flight plan that is associated with the flight. As illustrated in FIG. 9, the flight AA40, from Chicago International to Barcelona, Spain, is scheduled to depart at 20:00 Local time on Aircraft Number 8AL. The flight is currently delayed for 120 min. The Estimated Time of Return (ETR) is at 22:00 Local. As illustrated, the ETR is 2 hours past the Scheduled Departure time. SKD-L=2000L and ETR=2200L. Based on this information, the RAF application 15 identifies a few problems such as the 3rd pilot MOT time (FB MOT) is falling within 2 hours of the ETR (Estimated Time of Return). This indication is based on the fact that flight crew working hours are mandated and regulated by Federal Aviation Regulations (FARs). As per FAR117, crew cannot work more than a specific period of time during each 24 hours as well as many other restrictions, which is often referred to as Maximum Off Time (MOT). Moreover, the crew must be in the air by the MOT time. In response, the RAF application 15 has displayed a visual indicator in that the cell color of cell 550a is shaded light blue. As it gets closer to the departure time, the RAF application 15 changes the cell color, alerting the user 40 to take corrective action. In some instances, the user 40 reaches out to crew scheduling to ensure crew is available past MOT time in case a crew replacement becomes necessary. However, in some embodiments, the RAF application 15 checks the crew scheduling data automatically to ensure that there is a crew available past MOT time in case a crew replacement becomes necessary. The next identified problem is the connecting customers. The cell under "Connx" shows the number of connecting customers that are in jeopardy of losing their connections. In some embodiments, the cell color is shaded to indicate severity or increase in the number of connecting customers that are jeopardy of losing their connections. For example, as the delay increases, the number of "Connx" increases and the RAF application 15 changes the cell color from pink to red, drawing the user's attention to take further action. In some instances, the user 40 reaches out to the customer care team to provide contingency travel plans for the customers, such as rebooking them on a different flight or a partnering airline. However, in some embodiments, the RAF application 15 checks the customer care team data and/or otherwise initiates contact with the customer care team to provide contingency travel plans to the customers with missed connections. Based on the described scenario, the RAF application 15 starts to calculate the cost of misconnecting passengers, the delayed flight and other impacting costs, and suggests a new CI number. In some embodiments, the cell in the column 690 is a dark red and a new number appears. In some embodiments, the user 40 reaches out to the flight dispatcher to advise a higher CI that shows the importance of time compared to the cost of fuel. However, in some embodiments, the RAF application 15 automatically updates the data displayed or accessible to the flight dispatcher so that the CI number is automatically updated with the flight dispatcher. In some embodiments, the visual displays provided by the RAF application 15, such as the colored cells, provide a trigger point for the user 40 to take a specific action that eliminates or minimizes the operational impact to the overall airline operation.

At the step 380, and when the RAF application 15 has determined that the cost index is not economical, the RAF application 15 advises the most economical cost index. As noted above, in some embodiments, the RAF application 15 automatically updates the data displayed or accessible to the flight dispatcher so that the CI number is automatically updated with the flight dispatcher.

At the step 385, the RAF application 15 adjusts and/or continues as planned.

Turning back to FIG. 4E and after the step 290 (shown in FIG. 4B), the RAF application 15 shows the options on the screen 35 and the cost of each decision at the step 390. However, in some embodiments, a dialog box or other screen is automatically over at least a portion of, for example, the screen 35, 460, and/or 465. The dialog box is so automatically displayed if a flight with a relatively severe problem (lengthy delay and/or cancellation) has been identified. In some embodiments and when the RAF application 15 is updating the listing of flights 590 continuously or at a frequency independent from the user 40 selecting the button 595, the dialog box presenting the options is automatically presented on the GUI 20a in response to the identification or classification of a flight having a severe problem. The dialog box may present, in whole or in part, the following three options: (1) canceling the flight and the cost associated therewith; (2) delaying the flight and the cost associated therewith; and (3) ferrying an aircraft to be used by the flight and the cost associated therewith. However, other options are available. Generally, the RAF application accesses one or more applications from the one or more applications 25 during the step 290.

At the step 293, the RAF application 15 receives a selection of one option as the new option. In some embodiments, the RAF application 15 receives an indication that the user 40 has selected via the GUI 20a one of the options as the new option.

At the step 395, the RAF application 15 sends a message to a maintenance manager regarding the new option. In some embodiments, the message is sent via an email address, via a text alert, via a push notification, via an electronic chat box, and/or via another type of pop-up window on a GUI that the maintenance manager is viewing.

At the step 400, the RAF application 15 sends a message to the crew coordinator regarding the new option. In some embodiments, the message is sent via an email address, via a text alert, via a push notification, via an electronic chat box, and/or via another type of pop-up window on a GUI that the maintenance manager is viewing.

At the step 405, the RAF application 15 sends a message to the dispatcher regarding the new option. In some embodiments, the message is sent via an email address, via a text alert, via a push notification, via an electronic chat box, and/or via another type of pop-up window on a GUI that the maintenance manager is viewing.

At the step 410, the RAF application 15 determines whether the dispatch or others agree to the new option. In some embodiments, the step 410 includes identifying whether the system 10 has received, via an input device, confirmation that the dispatch or other agree with the option.

At the step 415, the RAF application 15 applies the new option. In some embodiments and after the approval of the new option, the RAF application 15 applies the new option by updating information in one or more of the applications 25. For example, when the new option is to cancel a flight, then the RAF application 15 updates the flight schedule via one of the one or more applications 25 to note that the flight is cancelled. In some embodiments, applying the new option at the step 415 also includes publishing the delayed and cancelled flights.

At the step 420, the RAF application 15 sends to the new option to reporting tab. In some embodiments, the step 420 includes updating the screen 35, 460, and/or 465.

Turning back to FIG. 4F and after the step 335 (shown in FIG. 4D), the RAF application 15 performs a route/cost-index analysis at step 425.

At the step 430, the RAF application 15 checks for dispatcher compliance.

At the step 435, the RAF application 15 checks for flight crew compliance.

At the step 440, the RAF application 15 generates a message of non-compliance to flight departure if needed. In some embodiments, the message is sent via an email address, via a text alert, via a push notification, via an electronic chat box, and/or via another type of pop-up window on a GUI.

At the step 445, the RAF application 15 performs an irregular operations/delay/cancellation analysis. As noted above, the RAF application 15 analyzes the origination of the delay and/or cancellation.

At the step 450, the RAF application 15 prepares debrief/root case analysis and save it as a lesson-learned.

At the step 455, the RAF application 15 triggers an alarm to the network regarding the planning/flight/station if occurrence is greater than 3 times over a predetermined period.

In some embodiments, the step 335 and/or the step 420 include updating any one or more of the screens 35, 460, 46, and 650.

Figure 10:
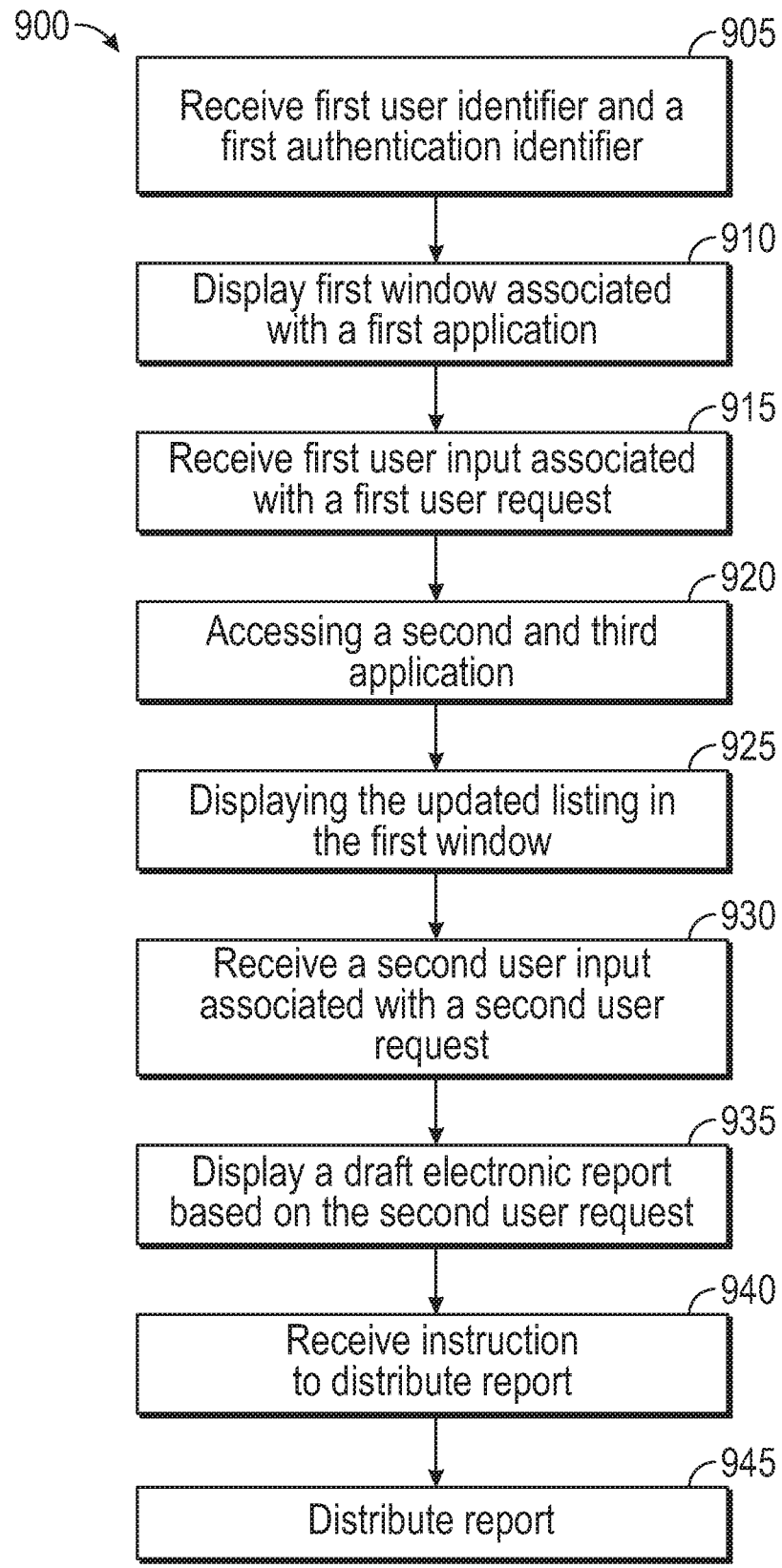
FIG. 10 is diagrammatic illustration of a method of operating the system of FIGS. 1-3 and 5-9, according to an example embodiment.

In an example embodiment, as illustrated in FIG. 10 with continuing reference to FIGS. 1-9, a method 900 of operating the system 10 includes receiving a first user identifier and a first authentication identifier at step 905; displaying a first window associated with a first application at step 910; receiving a first user input associated with a first user request at step 915; accessing a second and third application at step 920; displaying a listing of flights on the first window at step 925; receiving a second user input associated with a second user request via the first window at step 930; displaying via second window a draft electronic report based on the second user request at step 935; receiving instruction to distribute the report at step 940; and distributing the report at step 945.

At the step 905, the first user identifier and first authentication identifier are received by the system. In some embodiments, the step 905 is identical to the step 202.

At the step 910, the first window associated with a first application is displayed on the GUI. In some embodiments, the first window is the window 35.

At the step 915, a first user input associated with a first user request is received. In some embodiments, the first user input is the selection of button 595 to update the listing of flights 590. As such and in some embodiments, the first user request is an updated listing of flights 590. However, selection of the button 595 also automatically updates the screens 460 and 465, which are accessible via different tabs. That is, the selection of the button 595 is an instruction or request to update the screens 35, 460, and 465.

At the step 920, a second and third application are accessed. Generally, the second and third applications are two or more of the one or more applications 25 and are accessed in order to satisfy or fulfill the request received at the step 925. As such, the second and third applications are access in response to receiving the request at the step 915. In some embodiments, the RAF application 15 accesses two or more applications within the one or more applications 25 when updating the screens 35, 460, and 465.

At the step 925, the updated listing of flights 590 is displayed on the first window. Generally, the updated listing of flights 590 is displayed on the screen 35 and is updated to display the information accessed within the second and third applications.

At the step 930, a second user input associated with a second user request is received. In some embodiments, the second user input is associated with the button 600 being selected by the user 40. That is at the step 930, the RAF application 15 receives an indication that the button 600 has been selected. Generally, when the button 600 has been selected, the second user request is the creation of a draft delay report, as illustrated in FIG. 8.

At the step 935, a draft electronic report based on the second user request is displayed. In some embodiments, the draft electronic report is the report 70 illustrated in FIG. 8 and is displayed via the screen 650.

At the step 940, the RAF application 15 receives an instruction to distribute the report 70. In some embodiments, the step 940 includes the RAF application 15 receiving an indication that the button 655 has been selected by the user 40.

At the step 945 and in response to the receipt of the instruction to distribute the report 70, the RAF application 15 distributes the report 70. In some embodiments, the step 945 is identical or similar to the step 347.

During the method 200 and/or 900, the RAF application 15 accesses a variety of applications that are different from the first application and that is different from the RAF application 15. Generally, the RAF application 15 accesses the another application regardless of whether the user has provided his or her user identifier and user authentication identifier associated with that application. That is, even while the another application requires a user identifier and user authentication identifier for the user to access information directly, the RAF application 15 access the information within the another application without the user having to log into the another application.

In an example embodiment, the method 200 and/or the method 900 is a method of supporting airline flight operations. In several example embodiments, the airline is a commercial airline. In several example embodiments, the airline flight operations are, include, or are part of, a commercial airline's international flagship departures, which are monitored and tracked for the day of operation by executing one or more steps of the method 200 and/or the method 900.

In several example embodiments, execution of one or more steps of the method 200 and/or the method 900 enables an airline to follow up on, for example, all international flagship departures for the day of operation, monitoring and tracking the at least the following items: flight status; delay status; equipment swap; out-of-service equipment status (OTS); pilot legalities tracking (MOT); generation of ready-to-send automated report(s) for airline flights with operational issues; illustration of status of remains-over-night (RON)/curfew/slotted airports/flights.

In several example embodiments, the use of the screens 35, 460, and 465 allows for a visual comparison, among a number of flights, regarding the severity of a problem with each flight. That is, providing a visual indicator of a red highlighted cell in one column when the other cells in that column are not highlighted red quickly allows the user 40 to determine that the red highlighted cell has a much more severe problem than the other cells in that column. In some embodiments, the RAF application 15 can rank the flights in the listing of flights 590 by severity and display the ranked listing of flights 590.

In several example embodiments, execution of one or more steps of the method 200 and/or 900 enables personnel such as a sector manager, who is tasked to make airline flight operation decisions, to make operationally efficient decisions by, for example, reviewing the screens 35, 460, and/or 465, which are updated dynamically and automatically, and may also be updated on demand by selecting the "update" button 595. As a result, in several example embodiments, the most recent updates to the airline flights, or the listing of flights 590 in some embodiments, being monitored are captured with the stroke of a key. In several example embodiments, the screens 35, 460, and/or 465 include color-coded cells, which only highlight the airline flights with real issues—if a flight does not have an issue, there are no highlight(s) associated with that flight.

In several example embodiments, execution of one or more steps of the method 200 and/or 900 enables an automatic route analysis of different options, enabling the identification of the best options available at any point in time based on, for example, aircraft crew availability, airport information, passenger information, cargo information, one or more other items, or any combination thereof.

In an example embodiment, for an airline flight from Dallas-Ft. Worth to Frankfurt, Germany, a designated aircraft may be out of service, and the flight may be in jeopardy of losing its crew due to, for example, FAA rules; execution of one or more steps of the method 200 and/or 900 results in the changing of the aircraft for the airline flight. As such and when the RAF application 15 directly updates flight cancellation status or otherwise implements the new option selected, the RAF application 15 controls the movement of aircraft within the aircraft fleet 45. In several example embodiments, execution of one or more steps of the method 200 and/or the method 900 results in the automatic identification of flights with lengthy delays and/or possible canceled flights.

In several example embodiments, execution of one or more steps of the method 200 and/or 900 results in automatic notification(s) being sent to computing devices located remotely from the location of the computing device(s) executing the one or more steps of the method 200 and/or the method 900. For example, automatic notifications may be sent to a dispatcher, one or more domestic and/or foreign airports, etc. In several example embodiments, the automatic notifications may include recommendations, with such recommendations involving, for example, (1) canceling a flight (and possibly the cost associated therewith); (2) delaying a flight (and possibly the cost associated therewith); and (3) ferrying an aircraft to be used by a flight (and possibly the cost associated therewith).

In several example embodiments, execution of one or more steps of the method 200 and/or 900 enables a sector manager (or other personnel) to forgo checking several Sabre entries such as, but not limited to, tail swap, flight status, crew MOT, out of service status, if the airline flight is slotted, if there is a curfew at the destination airport, etc. Instead, in several example embodiments, execution of one or more steps of the method 200 results in the continuous and automatic scanning of all of the airline flights being monitored (e.g., 250+ flights), and the automatic and immediate capture or identification of problem airline flights. As such, the displays on screens 35, 460, 465, 650 and the function of the buttons 595, 600, and 655 improves the functioning of the computer 20. That is, the requirement for displaying a user login screen and sub screens and/or file folders of an application within the one or more applications 25 on the output device 20f and inputting login information and searching commands is eliminated, reduces the processing load compared to the computer 20 needing to present login screens and sub screens and/or file folders and receiving input commands relating to the searching. Reducing the processing load of the computer 20 generally improves the performance of the computer 20 such that the available memory of the computer 20 is increased, the processing capacity of the computer 20 is increased therefore making the computer 20 operate more efficiently, and the processing speed of the computer 20 is increased. Thus, the RAF application 15 improves the functioning of the computer 20 itself. That is, the system 10 results in specific improvements in computer capabilities (i.e., reduction of required memory and reduction of processing load).

Using the system 10 and/or completing at least a portion of the method 200 or 900 also provides an improvement to the technical field of data management. Conventionally, users (e.g., employees) are required to navigate through multiple screens in various systems to obtain information or at least identify a document in which desired information is stored. Even when the user 40 finds a document containing the desired information using conventional searching, the user 40 is required to navigate through the document to find the desired information. Thus, the user 40 is required to often read through multiple documents to find the correct answer. This opening and searching through documents increases the processing load of the computer 20.

Moreover, for conventional methods within the technical field of data management, if it is determined that an application should display new data points, then the application must ingest data into its back-end system. Changes are then required in the front-end system of the application. Only then will the new data points be available to a user using the application. Using the RAF application 15, however, when a user needs to access new data points, the RAF application 15 queries source system of the data to get the information needed to generate the reports and avoids the ingestion of data, and no changes are needed to the front-end system of the application, as is required in conventional methods.

Figure 11:
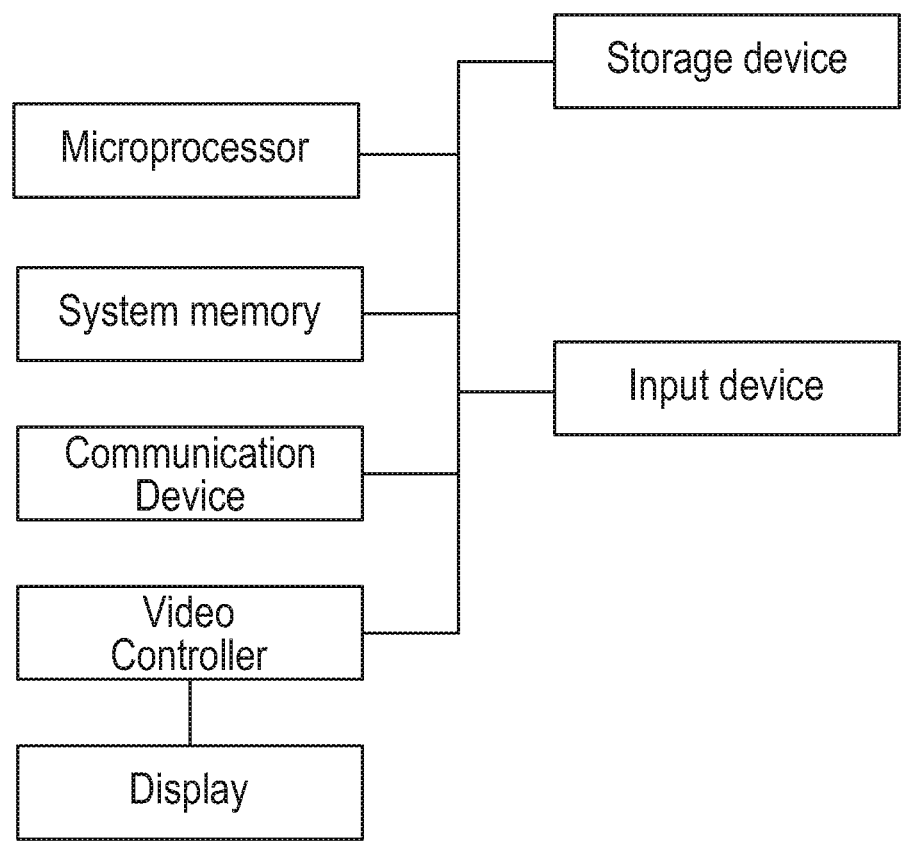
FIG. 11 is a diagrammatic illustration of a computing device, or node, for implementing one or more example embodiments of the present disclosure, according to an example embodiment.

In an example embodiment, as illustrated in FIG. 11 with continuing reference to FIGS. 1-3, 4A-4F, and 5-10, an illustrative computing device, or node, for implementing one or more of the example embodiments described above and/or illustrated in FIGS. 1-3, 4A-4F, and 5-10 is depicted. The node includes a microprocessor, an input device, a storage device, a video controller, a system memory, a display, and a communication device, all of which are interconnected by one or more buses. In several example embodiments, the storage device may include a floppy drive, hard drive, CD-ROM, optical drive, any other form of storage device, and/or any combination thereof. In several example embodiments, the storage device may include, and/or be capable of receiving, a floppy disk, CD-ROM, DVD-ROM, or any other form of computer-readable medium that may contain executable instructions. In several example embodiments, the communication device may include a modem, network card, or any other device to enable the node to communicate with other nodes. In several example embodiments, any node represents a plurality of interconnected (whether by intranet or Internet) computer systems, including without limitation, personal computers, mainframes, PDAs, smartphones and cell phones.

In several example embodiments, one or more of the components of the systems described above and/or illustrated in FIGS. 1-3, 4A-4F, and 5-10 include at least the node of FIG. 11 and/or components thereof, and/or one or more nodes that are substantially similar to the node of FIG. 11 and/or components thereof. In several example embodiments, one or more of the above-described components of the node of FIG. 11, the method of FIGS. 4A-4F and 10 include respective pluralities of same components.

In several example embodiments, one or more of the applications, systems, and application programs described above and/or illustrated in FIGS. 1-3, 4A-4F, and 5-10 include a computer program that includes a plurality of instructions, data, and/or any combination thereof; an application written in, for example, Arena, HyperText Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in several example embodiments pulls real-time information from one or more servers, automatically refreshing with latest information at a predetermined time increment; or any combination thereof.

In several example embodiments, a computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as floppy disks, flash memory, or a CD ROM, for example). In several example embodiments, software may include source or object code. In several example embodiments, software encompasses any set of instructions capable of being executed on a node such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random access memory (RAM) as well as semi-permanent data storage such as a compact disk read only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data, or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, a plurality of instructions stored on a computer readable medium may be executed by one or more processors to cause the one or more processors to carry out or implement in whole or in part the above-described operation of each of the above-described example embodiments of system(s), method(s), and/or any combination thereof. In several example embodiments, such a processor may include one or more of the microprocessor of the node of FIG. 11, any processor(s) that are part of the components of any system(s) that execute in whole or in part above-described method(s), and/or any combination thereof, and such a computer readable medium may be distributed among one or more components of the system(s). In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions.

The present disclosure introduces a method of displaying an electronic report on a graphical user interface ("GUI") of a computer, the method comprising: receiving, by one or more processors, a first user identifier and a first authentication identifier; wherein the first user identifier and the first authentication identifier are associated with a user of the computer gaining direct access to a first application; in response to receiving the first user identifier and the first authentication identifier, displaying, on the GUI, a first window that is associated with the first application; displaying, on the GUI and via the first window, a listing of monitored airline flights; after displaying the first window, receiving by the one or more processors and via the first window, a first user input associated with a request; accessing, using the one or more processors and the first application, a second application and a third application, with each of the first application and the second application being different from each other and the first application; updating the displayed listing of monitored airline flights using information accessed from the second application and the third application; wherein a first airline flight in the listing of monitored airline flights has a delay that is greater than two hours; receiving, by the one or more processors and via the first window, a second user input associated with a request for the electronic report for the first airline flight; and displaying, on the GUI and via a second window, the electronic report for the first airline flight; wherein the electronic report for the first airline flight includes information from each of the second application and the third application. In one embodiment, the first application is configured to require receipt, by the one or more processors, of the first user identifier and the first authentication identifier to allow the user to gain access to the first application; wherein the method further comprises, in response to the receipt of the first user identifier and the first authentication identifier by the one or more processors, the user gaining access to information within the first application; wherein the second application is configured to require receipt, by the one or more processors, of a second user identifier and a second authentication identifier to allow the user to gain direct access to information within the second application; wherein the third application is configured to require receipt, by the one or more processors, of a third user identifier and a third authentication identifier to allow the user to gain direct access to information within the third application; and wherein the first application displays information from the second application and the third application on the first window and the second window before the one or more processors receives the second user identifier, the second authentication identifier, the third user identifier, and the third authentication identifier. In one embodiment, the first application displays, in the second window, information from the second application and the third application without the user gaining direct access to the second application and the third application. In one embodiment, displaying, on the first window, information from the second application and the third application without the user gaining direct access to the second application and the third application reduces a processing load on the computer. In one embodiment, the method also includes identifying, by the one or more processors and using the first application, a first cost index associated with the first airline flight; wherein the first cost index is a function of a ratio of a cost of the delay to a cost of fuel associated with a duration of the first airline flight; determining, by the one or more processors and using the first application, a number of customers impacted by the delay of the first airline flight to update the cost of the delay; and creating, by the one or more processors and using the first application, a second cost index to reflect the cost of the delay based on the number of customers impacted by the delay. In one embodiment, the method further includes: determining, by the one or more processors and using the first application, a number of customers impacted by a reduced delay of the first airline flight; and reducing, by the one or more processors and using the first application, the duration of the first airline flight to shorten the delay to the reduced delay thereby reducing the number of customers impacted by the delay. In one embodiment, the method also includes automatically updating, by the one or more processors and using the first application, a flight plan of the first airline flight to include the reduced duration of the first airline flight. In one embodiment, the method also includes receiving, by the one or more processors and via the second window, a third user input associated with a comment to be added to the electronic report to create a final electronic report; and receiving, by the one or more processors and via the second window, a fourth user input associated with a request to transmit the final electronic report to another user via another computer. In one embodiment, the method also includes providing, using the first application, a visual indicator on the first window when the first airline flight has a delay that is greater than two hours. In one embodiment, the duration of the delay is displayed as a number on the first window and wherein the visual indicator comprises a color displayed behind the number. In one embodiment, the method also includes determining, by the one or more processors and using the first application, a root cause of the delay based on the electronic report for the first airline flight.

The present disclosure introduces an apparatus adapted to display an electronic report on a graphical user interface ("GUI") of a computer, the apparatus comprising: a non-transitory computer readable medium having stored thereon a plurality of instructions, wherein the instructions are executed with at least one processor so that the following steps are executed: receiving, by one or more processors, a first user identifier and a first authentication identifier; wherein the first user identifier and the first authentication identifier are associated with a user of the computer gaining direct access to a first application; in response to receiving the first user identifier and the first authentication identifier, displaying, on the GUI, a first window that is associated with the first application; displaying, on the GUI and via the first window, a listing of monitored airline flights; after displaying the first window, receiving by the one or more processors and via the first window, a first user input associated with a request; accessing, using the one or more processors and the first application, a second application and a third application, with each of the first application and the second application being different from each other and the first application; updating the displayed listing of monitored airline flights using information accessed from the second application and the third application; wherein a first airline flight in the listing of monitored airline flights has a delay that is greater than two hours; receiving, by the one or more processors and via the first window, a second user input associated with a request for the electronic report for the first airline flight; and displaying, on the GUI and via a second window, the electronic report for the first airline flight; wherein the electronic report for the first airline flight includes information from each of the second application and the third application. In one embodiment, the first application is configured to require receipt, by the one or more processors, of the first user identifier and the first authentication identifier to allow the user to gain access to the first application; wherein the method further comprises, in response to the receipt of the first user identifier and the first authentication identifier by the one or more processors, the user gaining access to information within the first application; wherein the second application is configured to require receipt, by the one or more processors, of a second user identifier and a second authentication identifier to allow the user to gain direct access to information within the second application; wherein the third application is configured to require receipt, by the one or more processors, of a third user identifier and a third authentication identifier to allow the user to gain direct access to information within the third application; and wherein the first application displays information from the second application and the third application on the first window and the second window before the one or more processors receives the second user identifier, the second authentication identifier, the third user identifier, and the third authentication identifier. In one embodiment, the first application displays, on the second window, information from the second application and the third application without the user gaining direct access to the second application and the third application In one embodiment, displaying, on the first window, information from the second application and the third application without the user gaining direct access to the second application and the third application reduces a processing load on the computer. In one embodiment, the instructions are executed with at least one processor so that the following further steps are executed: Identifying, by the one or more processors and using the first application, a first cost index associated with the first airline flight; wherein the first cost index is a function of a ratio of a cost of the delay to a cost of fuel associated with a duration of the first airline flight; determining, by the one or more processors and using the first application, a number of customers impacted by the delay of the first airline flight to update the cost of the delay; and creating, by the one or more processors and using the first application, a second cost index to reflect the cost of the delay based on the number of customers impacted by the delay. In one embodiment, the instructions are executed with at least one processor so that the following further step is executed: determining, by the one or more processors and using the first application, a number of customers impacted by a reduced delay of the first airline flight; and reducing, by the one or more processors and using the first application, the duration of the first airline flight to shorten the delay to the reduced delay thereby reducing the number of customers impacted by the delay. In one embodiment, the instructions are executed with at least one processor so that the following further step is executed: updating, by the one or more processors and using the first application, a flight plan of the first flight to include the reduced duration of the first airline flight. In one embodiment, the instructions are executed with at least one processor so that the following further steps are executed: receiving, by the one or more processors and via the second window, a third user input associated with a comment to be added to the electronic report to create a final electronic report; and receiving, by the one or more processors and via the second window, a fourth user input associated with request to transmit the final electronic report to another user via another computer. In one embodiment, the instructions are executed with at least one processor so that the following further step is executed: providing, by the one or more processors and using the first application, a visual indicator on the first window when the first airline flight has a delay that is greater than two hours. In one embodiment, the duration of the delay is displayed as a number on the first window and wherein the visual indicator comprises a color displayed behind the number. In one embodiment, the instructions are executed with at least one processor so that the following further step is executed: determining, by the one or more processors and using the first application, a root cause of the delay based on the electronic report for the first airline flight.

It is understood that variations may be made in the foregoing without departing from the scope of the present disclosure. For example, instead of, or in addition to transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries, and other industries. In an example embodiment, aspects of the present disclosure are readily applicable and/or readily adaptable to a shipping travel leg in which a ship travels from one port to one or more other ports. In an example embodiment, aspects of the present disclosure are readily applicable and/or readily adaptable to a trucking travel leg during which a truck travels from one city to one or more other cities. In an example embodiment, aspects of the present disclosure are readily applicable and/or readily adaptable to a rail travel leg during which a train travels from one city or station to one or more other cities or stations. In an example embodiment, aspects of the present disclosure are applicable and/or readily adaptable to a wide variety of transportation transactions such as, for example, an airline sequence or itinerary (i.e., a plurality of airline flights), a travel leg of an airline sequence or itinerary (i.e., a single airline flight), an airline block, and/or any combination thereof.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously, and/or sequentially. In several example embodiments, the steps, processes and/or procedures may be merged into one or more steps, processes, and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several example embodiments have been described in detail above, the embodiments described are examples only and are not limiting, and those skilled in the art will readily appreciate that many other modifications, changes, and/or substitutions are possible in the example embodiments without materially departing from the novel teachings and advantages of the present disclosure. Accordingly, all such modifications, changes, and/or substitutions are intended to be included within the scope of this disclosure as defined in the following claims.

In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A method of displaying an electronic report on a graphical user interface ("GUI") of a computer, the method comprising:
   receiving, by one or more processors, a first user identifier and a first authentication identifier;
   wherein the first user identifier and the first authentication identifier are associated with a user of the computer gaining direct access to a first application;
   in response to receiving the first user identifier and the first authentication identifier, displaying, on the GUI, a first window that is associated with the first application;
   displaying, on the GUI and via the first window, a listing of monitored airline flights;
   receiving, by the one or more processors and via the first window, a first user input associated with a request for an update of the listing of the monitored airline flights;
   in response to receiving the request for the update of the listing of the monitored airline flights, the first application accesses a second application and a third application, with each of the second application and the third application being different from each other and the first application;
   updating the displayed listing of the monitored airline flights using information accessed from the second application and the third application;
     wherein a first airline flight in the listing of monitored airline flights has a delay that is greater than two hours;
   receiving, by the one or more processors and via the first window, a second user input associated with a request for the electronic report for the first airline flight; and
   displaying, on the GUI and via a second window that is associated with the first application, the electronic report for the first airline flight;

wherein the electronic report for the first airline flight includes information from each of the second application and the third application.

2. The method of claim 1,
wherein the first application is configured to require receipt, by the one or more processors, of the first user identifier and the first authentication identifier to allow the user to gain access to the first application;
wherein the method further comprises, in response to the receipt of the first user identifier and the first authentication identifier by the one or more processors, the user gaining access to information within the first application;
wherein the second application is configured to require receipt, by the one or more processors, of a second user identifier and a second authentication identifier to allow the user to gain direct access to information within the second application;
wherein the third application is configured to require receipt, by the one or more processors, of a third user identifier and a third authentication identifier to allow the user to gain direct access to information within the third application; and
wherein the first application displays information from the second application and the third application on the first window and the second window before the one or more processors receive(s) the second user identifier, the second authentication identifier, the third user identifier, and the third authentication identifier.

3. The method of claim 2, wherein the first application displays, on the second window, information from the second application and the third application without the user gaining direct access to the second application and the third application.

4. The method of claim 3, wherein displaying, on the second window, information from the second application and the third application without the user gaining direct access to the second application and the third application reduces a processing load on the computer.

5. The method of claim 1, further comprising:
identifying, by the one or more processors and using the first application, a first cost index associated with the first airline flight;
wherein the first cost index is a function of a ratio of a cost of the delay to a cost of fuel associated with a duration of the first airline flight;
determining, by the one or more processors and using the first application, a number of customers impacted by the delay of the first airline flight to update the cost of the delay; and
creating, by the one or more processors and using the first application, a second cost index to reflect the cost of the delay based on the number of customers impacted by the delay.

6. The method of claim 5, further comprising:
determining, by the one or more processors and using the first application, a number of customers impacted by a reduced delay of the first airline flight;
reducing, by the one or more processors and using the first application, the duration of the first airline flight to shorten the delay to the reduced delay thereby reducing the number of customers impacted by the delay; and
automatically updating, by the one or more processors and using the first application, a flight plan of the first airline flight to include the reduced duration of the first airline flight.

7. The method of claim 1, further comprising determining, by the one or more processors and using the first application, a root cause of the delay based on the electronic report for the first airline flight.

8. The method of claim 1, further comprising:
receiving, by the one or more processors and via the second window, a third user input associated with a comment to be added to the electronic report to create a final electronic report; and
receiving, by the one or more processors and via the second window, a fourth user input associated with a request to transmit the final electronic report to another user via another computer.

9. The method of claim 1, further comprising providing, using the first application, a visual indicator on the first window when the first airline flight has a delay that is greater than two hours.

10. The method of claim 9, wherein the duration of the delay is displayed as a number on the first window and wherein the visual indicator comprises a color displayed behind the number.

11. An apparatus adapted to display an electronic report on a graphical user interface ("GUI") of a computer, the apparatus comprising:
a non-transitory computer readable medium; and
a plurality of instructions stored on the non-transitory computer readable medium, wherein the instructions are executed with at least one processor so that the following steps are executed:
receiving a first user identifier and a first authentication identifier;
wherein the first user identifier and the first authentication identifier are associated with a user of the computer gaining direct access to a first application;
in response to receiving the first user identifier and the first authentication identifier, displaying, on the GUI, a first window that is associated with the first application;
displaying, on the GUI and via the first window, a listing of monitored airline flights;
receiving, via the first window, a first user input associated with a request for an update of the listing of the monitored airline flights;
in response to receiving the request for the update of the listing of the monitored airline flights, the first application accesses a second application and a third application, with each of the second application and the third application being different from each other and the first application;
updating the displayed listing of monitored airline flights using information accessed from the second application and the third application;
wherein a first airline flight in the listing of monitored airline flights has a delay that is greater than two hours;
receiving, via the first window, a second user input associated with a request for the electronic report for the first airline flight; and
displaying, on the GUI and via a second window that is associated with the first application, the electronic report for the first airline flight;
wherein the electronic report for the first airline flight includes information from each of the second application and the third application.

12. The apparatus of claim 11,
wherein the first application is configured to require receipt of the first user identifier and the first authentication identifier to allow the user to gain access to the first application;

wherein the second application is configured to require receipt of a second user identifier and a second authentication identifier to allow the user to gain direct access to information within the second application;

wherein the third application is configured to require receipt of a third user identifier and a third authentication identifier to allow the user to gain direct access to information within the third application; and wherein the first application displays information from the second application and the third application on the first window and the second window before the receipt of each of the second user identifier, the second authentication identifier, the third user identifier, and the third authentication identifier.

13. The apparatus of claim 12, wherein the first application displays, on the second window, information from the second application and the third application without the user gaining direct access to the second application and the third application.

14. The apparatus of claim 13, wherein displaying, on the second window, information from the second application and the third application without the user gaining direct access to the second application and the third application reduces a processing load on the computer.

15. The apparatus of claim 11, wherein the instructions are executed with at least one processor so that the following further steps are executed:

identifying, using the first application, a first cost index associated with the first airline flight;

wherein the first cost index is a function of a ratio of a cost of the delay to a cost of fuel associated with a duration of the first airline flight;

determining, using the first application, a number of customers impacted by the delay of the first airline flight to update the cost of the delay; and creating, using the first application, a second cost index to reflect the cost of the delay based on the number of customers impacted by the delay.

16. The apparatus of claim 15, wherein the instructions are executed with at least one processor so that the following further steps are executed:

determining, using the first application, a number of customers impacted by a reduced delay of the first airline flight;

reducing, using the first application, the duration of the first airline flight to shorten the delay to the reduced delay thereby reducing the number of customers impacted by the delay; and updating, using the first application, a flight plan of the first flight to include the reduced duration of the first airline flight.

17. The apparatus of claim 11, wherein the instructions are executed with at least one processor so that the following further step is executed: determining, using the first application, a root cause of the delay based on the electronic report for the first airline flight.

18. The apparatus of claim 11, wherein the instructions are executed with at least one processor so that the following further steps are executed:

receiving, via the second window, a third user input associated with a comment to be added to the electronic report to create a final electronic report; and receiving, via the second window, a fourth user input associated with request to transmit the final electronic report to another user via another computer.

19. The apparatus of claim 11, wherein the instructions are executed with at least one processor so that the following further step is executed: providing, using the first application, a visual indicator on the first window when the first airline flight has a delay that is greater than two hours.

20. The apparatus of claim 19, wherein the duration of the delay is displayed as a number on the first window and wherein the visual indicator comprises a color displayed behind the number.

21. The apparatus of claim 11, further comprising the computer.

22. The apparatus of claim 21, wherein the computer comprises the non-transitory computer readable medium.

* * * * *